(12) United States Patent
Kurokawa

(10) Patent No.: US 11,782,431 B2
(45) Date of Patent: Oct. 10, 2023

(54) CONTROL DEVICE AND NON-TRANSITORY COMPUTER-READABLE RECORDING MEDIUM RECORDING PROGRAM

(71) Applicant: OMRON Corporation, Kyoto (JP)

(72) Inventor: Yoichi Kurokawa, Kyoto (JP)

(73) Assignee: OMRON Corporation, Kyoto (JP)

( * ) Notice: Subject to any disclaimer, the term of this patent is extended or adjusted under 35 U.S.C. 154(b) by 330 days.

(21) Appl. No.: 17/293,047

(22) PCT Filed: Nov. 26, 2019

(86) PCT No.: PCT/JP2019/046083
§ 371 (c)(1),
(2) Date: May 12, 2021

(87) PCT Pub. No.: WO2020/129545
PCT Pub. Date: Jun. 25, 2020

(65) Prior Publication Data
US 2022/0004177 A1    Jan. 6, 2022

(30) Foreign Application Priority Data
Dec. 20, 2018 (JP) .............................. 2018-238375

(51) Int. Cl.
G05B 23/02    (2006.01)
G05B 13/02    (2006.01)

(52) U.S. Cl.
CPC ..... G05B 23/0254 (2013.01); G05B 13/0265 (2013.01)

(58) Field of Classification Search
CPC ................................................ G05B 13/0265

USPC .................................................... 700/29, 110
See application file for complete search history.

(56) References Cited

U.S. PATENT DOCUMENTS

| | | | |
|---|---|---|---|
| 11,504,440 B2 * | 11/2022 | Marik | ................... C07B 59/002 |
| 2011/0202160 A1 | 8/2011 | Moyne | |
| 2017/0344909 A1 | 11/2017 | Kurokawa et al. | |

(Continued)

FOREIGN PATENT DOCUMENTS

| | | | |
|---|---|---|---|
| CN | 105468887 | 4/2016 | |
| CN | 108563217 | 9/2018 | |
| CN | 108563217 A * | 9/2018 | ......... G05B 23/0243 |

(Continued)

OTHER PUBLICATIONS

"Search Report of Europe Counterpart Application", dated Aug. 19, 2022, p. 1-p. 9.

(Continued)

*Primary Examiner* — Ronald D Hartman, Jr.
(74) *Attorney, Agent, or Firm* — JCIPRNET

(57) ABSTRACT

The disclosure provides an environment in which it is possible to switch an algorithm involved in an abnormality detection process. A control device: calculates a feature quantity from a state value acquired from a monitored object; uses a learning model on the basis of the calculated feature quantity to execute one of a plurality of types of algorithms for calculating a value indicating the probability that an abnormality is occurring in the monitored object; determines, on the basis of the calculated value, whether the abnormality is occurring; and switches, in accordance with a condition defined in advance, the one algorithm that is executed.

9 Claims, 16 Drawing Sheets

(56) References Cited

U.S. PATENT DOCUMENTS

2018/0164781 A1* 6/2018 Kubo ................. G05B 19/4083
2021/0201091 A1* 7/2021 Yadav .................... G06N 20/20

FOREIGN PATENT DOCUMENTS

| | | | | |
|---|---|---|---|---|
| CN | 108628263 | | 10/2018 | |
| JP | 2016045861 | | 4/2016 | |
| JP | 2016045861 A * | | 4/2016 | |
| JP | 2017211930 | | 11/2017 | |
| JP | 2017211930 A * | | 11/2017 | ....... G05B 19/41885 |
| JP | 6315528 | | 4/2018 | |
| JP | 6315528 B1 * | | 4/2018 | ............ G05B 23/02 |
| JP | 2018092613 | | 6/2018 | |
| JP | 2018097839 | | 6/2018 | |
| JP | 2019045942 | | 3/2019 | |
| JP | 2019045942 A * | | 3/2019 | ........... G05B 23/021 |
| JP | 2020101904 A * | | 7/2020 | ......... G05B 13/0265 |
| WO | 2018146733 | | 8/2018 | |

OTHER PUBLICATIONS

"International Search Report (Form PCT/ISA/210) of PCT/JP2019/046083," dated Jan. 28, 2020, with English translation thereof, pp. 1-4.

"Written Opinion of the International Searching Authority (Form PCT/ISA/237) of PCT/JP2019/046083," dated Jan. 28, 2020, with English translation thereof, pp. 1-8.

"Office Action of China Counterpart Application", dated Jun. 7, 2023, with English translation thereof, pp. 1-17.

* cited by examiner

| 170: Determination result | | Definition |
|---|---|---|
| Normality | | A state where the device is behaving as usual. |
| Abnormality | | A state where the device is behaving differently than usual. |
| Failure | | A state where the operation of the device is impaired and the production is adversely affected.<br>A type of device event. |
| Alarm level 1 | | An intermediate state between the alarm level 1 threshold value and the alarm level 2 threshold value. |
| Alarm level 2 | | A state of exceeding the alarm level 2 threshold value. |
| Note | Alarm level 1 threshold value | A threshold value set by the user in the abnormality state of the device, the threshold value being on the side closer to normality. |
| | Alarm level 2 threshold value | A threshold value set by the user in the abnormality state of the device, the threshold value being on the side closer to failure. |

FIG. 7

| Item | Algorithm example | |
|---|---|---|
| | LOF | iForest |
| Processing time | Long | Short |
| Accuracy | High | Low |

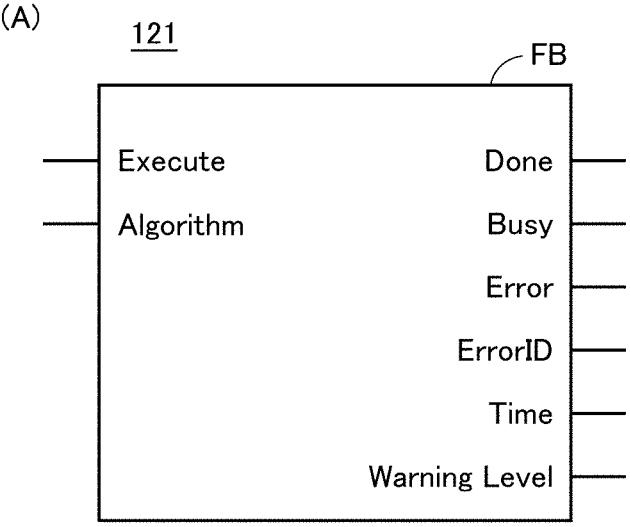

(B)

| Input variable | Name | Data type | Content |
|---|---|---|---|
| Execute | Activate | BOOL | Start processing at startup |
| Algorithm | Machine learning algorithm | USINT | 0: LOF; 1: iForest, etc. |

(C)

| Output variable | Name | Data type | Content |
|---|---|---|---|
| Done | Completion | BOOL | TRUE when processing is completed |
| Busy | Running | BOOL | TRUE when processing is accepted |
| Error | Error | BOOL | TRUE when an error occurs |
| ErrorID | Error code | WORD | Output error code |
| Time | Algorithm processing time | UDINT | Output processing time of the algorithm |
| WarningLevel | Warning level | UINT | Output warning level 0: Normality; 1: Abnormality; 2: Failure |

FIG. 12

CONTROL DEVICE AND NON-TRANSITORY COMPUTER-READABLE RECORDING MEDIUM RECORDING PROGRAM

CROSS-REFERENCE TO RELATED APPLICATION

This application is a 371 application of the International PCT application serial no. PCT/JP2019/046083, filed on Nov. 26, 2019, which claims the priority benefits of Japan Patent Application No. 2018-238375, filed on Dec. 20, 2018. The entirety of each of the above-mentioned patent applications is hereby incorporated by reference herein and made a part of this specification.

BACKGROUND

Technical Field

The disclosure relates to a control device and a non-transitory computer-readable recording medium recording a program capable of detecting any abnormality that may occur in a monitored object.

Description of Related Art

At various production sites, there is a need to improve the equipment operation rate by predictive maintenance of machines or device. Predictive maintenance means a maintenance mode in which maintenance work such as repair or replacement is performed before the equipment is in a state where it must be stopped by detecting any abnormality occurring in the machine or device.

In order to realize predictive maintenance, it is necessary to have a mechanism to collect the state values of the machine or device and to determine whether any abnormality is occurring in the machine or device based on the collected state values.

For example, Japanese Patent Application Laid-open No. 2017-211930 (Patent Document 1) proposes a method for predicting a life failure of a device to which machine learning is applied as such a mechanism.

RELATED ART

Patent Document

[Patent Document 1] Japanese Laid-Open No. 2017-211930

SUMMARY

Technical Problem

Currently, various algorithms for detecting abnormalities by machine learning have been proposed. For example, various algorithms having different merits such as one that outputs a highly accurate processing result although the processing time is long, or one that requires a short processing time although the processing result is not highly accurate have been proposed. In addition, at the production site, there are various needs such as to perform strict abnormality detection, or to perform abnormality detection without spending much time. Therefore, an environment which provides a plurality of algorithms that meet such various needs is desired. However, Patent Document 1 does not propose an environment for preparing a plurality of algorithms to be applied to a machine learning device, and therefore cannot meet such needs.

The disclosure provides an environment in which an algorithm related to the abnormality detection processing can be appropriately switched.

Solution to the Problem

According to an example of the disclosure, a control device that controls a controlled object disposed in a production process includes: a feature extraction part which calculates one or a plurality of feature quantities from one or a plurality of state values acquired from a monitored object included in the controlled object; a processing part which refers to a learning model and executes one of a plurality of types of algorithms for calculating a score, which is a value indicating a probability whether any abnormality is occurring in the monitored object, based on the one or plurality of feature quantities calculated by the feature extraction part; a determination part which generates a determination result indicating whether any abnormality is occurring in the monitored object based on the score calculated by the processing part; and a switching part which switches the one algorithm executed by the processing part according to a predetermined condition.

According to the disclosure, it is possible to appropriately switch the algorithm for calculating the score, which is a value indicating the probability whether any abnormality is occurring in the monitored object, according to the predetermined condition.

In the above disclosure, the predetermined condition includes a condition based on a processing time of the one algorithm executed by the processing part.

According to the disclosure, it is possible to switch to another algorithm according to the processing time of the algorithm.

In the above disclosure, the predetermined condition includes a condition based on a processing time of the one algorithm executed by the processing part and a processing time required for a processing that generates the determination result based on the score generated by the determination part.

According to the disclosure, it is possible to switch to another algorithm according to the processing time of the algorithm and the processing time required for the processing that generates the determination result.

In the above disclosure, the predetermined condition includes a condition based on the determination result generated by the determination part.

According to the disclosure, it is possible to switch the algorithm according to the determination result generated by the determination part.

In the above disclosure, the predetermined condition includes a condition based on switching of a production process.

According to the disclosure, it is possible to switch the algorithm according to the switching of the production process.

In the above disclosure, the learning model is commonly applied to the plurality types of algorithms.

According to the disclosure, the learning model may be inherited by another algorithm after switching.

In the above disclosure, the learning model is an aggregate of feature quantities generated from data acquired from the monitored object and defined by one or more elements, and the control device further inherits a parameter regarding a range in an aggregate of the feature quantities used for calculating the score to an algorithm after switching.

According to the disclosure, the parameter regarding the range in the aggregate of the feature quantities used for calculating the score may be inherited by the algorithm after switching.

In the above disclosure, the plurality types of algorithms differ in a processing time of the algorithm or an accuracy of the calculated score.

According to the disclosure, by switching the algorithm, the processing time of the algorithm or the accuracy of the calculated score may be made different.

In the above disclosure, a multitask execution part which executes a plurality of tasks including a control task for performing a real-time control of the controlled object and a related processing task for performing a related processing related to the real-time control is further included. The multitask execution part repeatedly executes the control task at a predetermined cycle. The multitask execution part executes a determination processing by the determination part in the control task, and executes calculation of the score by the processing part in the related processing task. The condition based on the processing time of the algorithm includes a condition that the processing time exceeds a time based on the predetermined cycle.

According to the disclosure, since the algorithm may be switched so that the score is calculated in synchronization with the predetermined cycle in which the real-time control is performed, the real-time control of the controlled object may be performed based on the result of the determination processing based on the score.

According to another example of the disclosure, a non-transitory computer-readable recording medium recording a program for causing a processor to execute a control method that controls a controlled object disposed in a production process is provided. The control method includes: a step of calculating one or a plurality of feature quantities from one or a plurality of state values acquired from a monitored object included in the controlled object; a step of referring to a learning model and executing one of a plurality of types of algorithms for calculating a score, which is a value indicating a probability whether any abnormality is occurring in the monitored object, based on the calculated one or plurality of feature quantities; a step of generating a determination result indicating whether any abnormality is occurring in the monitored object based on the calculated score; and a step of switching the one algorithm executed in the step of executing according to a predetermined condition.

According to the disclosure, by executing the program, it is possible to appropriately switch the algorithm for calculating the score, which is a value indicating the probability whether any abnormality is occurring in the monitored object, according to the predetermined condition.

Effects

According to the disclosure, the algorithm for calculating the probability that any abnormality is occurring in the monitored object can be appropriately switched according to the predetermined condition.

BRIEF DESCRIPTION OF THE DRAWINGS

FIG. 7 is a diagram illustrating an example of definitions of the determination result 170 according to the embodiment.

FIG. 8 is a diagram showing a comparison of the performance of the algorithms according to the embodiment.

FIG. 12 is a diagram illustrating the function block 121 of the machine learning processing according to the embodiment.

DESCRIPTION OF THE EMBODIMENTS

Figure 1:
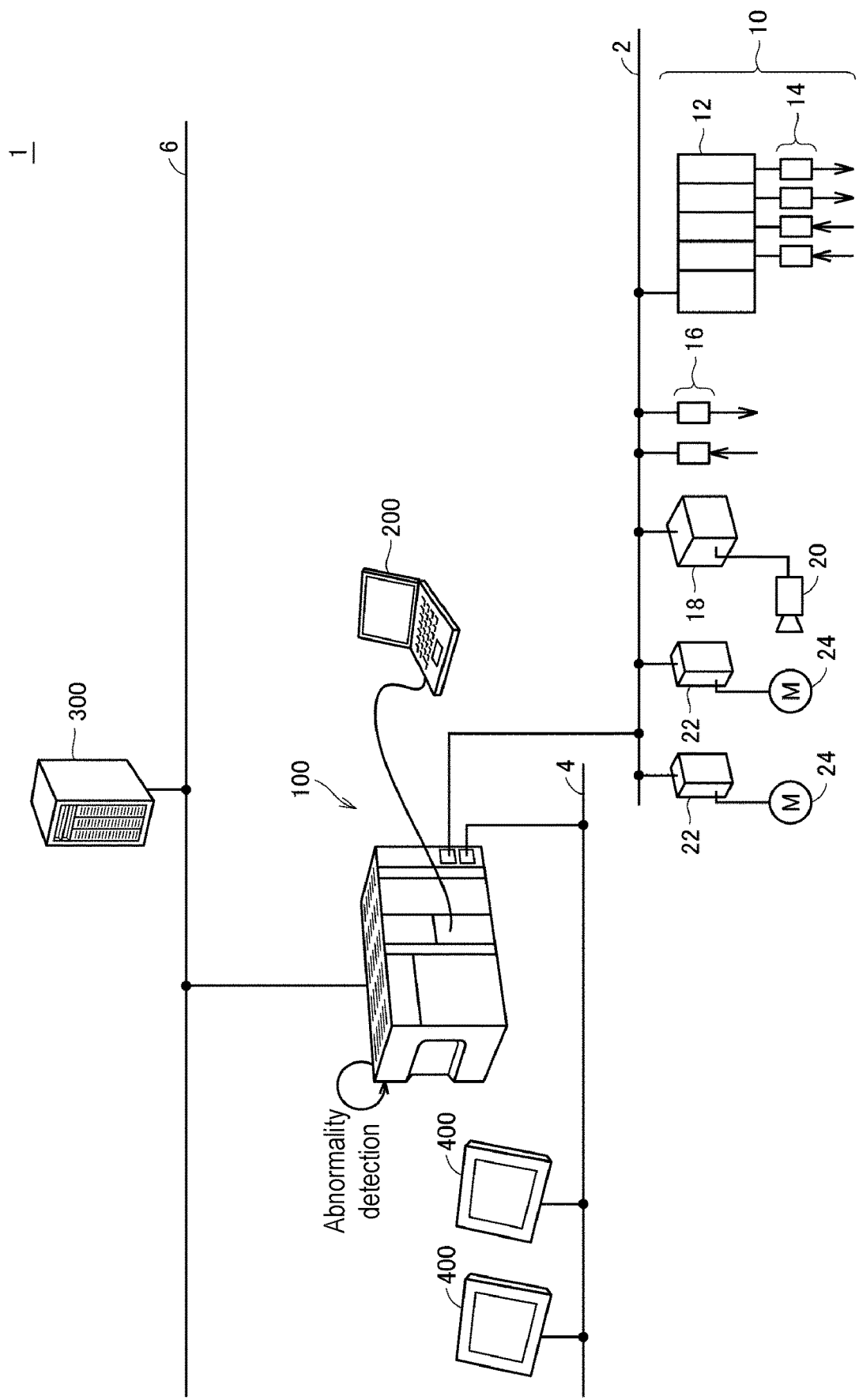
FIG. 1 is a schematic diagram showing an example of the overall configuration of the abnormality detection system 1 according to the embodiment.

Embodiments of the disclosure will be described in detail below with reference to the drawings. Further, in the drawings, the same or corresponding parts are denoted by the same reference numerals, and descriptions thereof will not be repeated.

A. Application Example

First, an example of the scenario to which the disclosure is applied will be described.

An example of a functional configuration of a control system capable of executing an abnormality detection processing according to the embodiment will be described. In the following description, the entire control system is also referred to as an "abnormality detection system" because the description mainly focuses on the abnormality detection processing provided in the control system that controls a controlled object disposed in a production process.

First, an example of the overall configuration of the abnormality detection system 1 according to the embodiment will be described.

FIG. 1 is a schematic diagram showing an example of the overall configuration of the abnormality detection system 1 according to the embodiment. With reference to FIG. 1, the abnormality detection system 1 includes, as main components, a control device 100 that controls a controlled object and a support device 200 that is connectable to the control device 100. The abnormality detection system 1 may further include a host server 300 and a display device 400 as an optional configuration.

The control device 100 generates a determination result indicating whether any abnormality is occurring in a monitored object included in the controlled object. The control device 100 may be implemented as a kind of computer such as a programmable logic controller (PLC).

More specifically, the control device 100 is connected to a field device group 10 via a first fieldbus 2 and is connected to one or a plurality of display devices 400 via a second fieldbus 4. Further, the control device 100 is connected to the host server 300 via a local network 6. The control device 100 exchanges data with the connected devices via respective networks.

The control device 100 executes various control calculations for controlling an equipment or a machine, and also executes the abnormality detection processing for detecting an abnormality occurring in the controlled object. By executing the abnormality detection processing in the control device 100, it is possible to detect an abnormality that may occur in the controlled object in a shorter cycle.

In the disclosure, a "state value" is a term including a value that is observable by any controlled object (or monitored object), and for example, may include a physical value that can be measured by any sensor, an ON/OFF state of a relay or a switch, a command value such as a position, a speed, and a torque given to a servo driver by the PLC, a variable value used by the PLC for calculation, and the like.

The state value observed by any controlled object and transferred to the control device 100 is also referred to as an "input value" hereinafter.

It is preferable to adopt as the first fieldbus 2 and the second fieldbus 4 networks that perform constant cyclic communication in which the arrival time of data is guaranteed. EtherCAT (registered trademark) and the like are known as networks that perform such constant cyclic communication.

The field device group 10 includes a device that collects a state value of a controlled object, a production line or a manufacturing device provided in the production process related to the control (hereinafter also collectively referred to as a "field") as an input value. An input relay, various sensors, or the like is assumed as the device for acquiring such a state value. The field device group 10 further includes a device that exerts some action on the field based on a command value (hereinafter also referred to as an "output value") generated by the control device 100. An output relay, a contactor, a servo driver, a servo motor, or any other actuator is assumed as the device that exerts some action on such a field. The field device group 10 exchanges data including the input value and the output value with the control device 100 via the first fieldbus 2.

In the configuration example shown in FIG. 1, the field device group 10 includes a remote input/output (I/O) device 12, a relay group 14, an image sensor 18 and a camera 20, and a servo driver 22 and a servo motor 24.

The remote I/O device 12 includes a communication part that communicates via the first fieldbus 2 and an input/output part (hereinafter also referred to as an "I/O unit") for acquiring an input value and outputting an output value. The input value and the output value are exchanged between the control device 100 and the field via such an I/O unit. FIG. 1 shows an example in which digital signals are exchanged as the input value and the output value via the relay group 14.

The I/O unit may be directly connected to the fieldbus. FIG. 1 shows an example in which an I/O unit 16 is directly connected to the first fieldbus 2.

The image sensor 18 performs an image measurement processing such as pattern matching on image data captured by the camera 20, and transmits the processing result to the control device 100.

The servo driver 22 drives the servo motor 24 according to an output value (for example, a position command) from the control device 100.

As described above, data is exchanged between the control device 100 and the field device group 10 via the first fieldbus 2, and such exchanged data is updated in a very short cycle of hundreds of pec orders to tens of msec orders. Further, a data update processing of such exchanged data may be referred to as an "I/O refresh processing."

The support device 200 is a device that supports the preparation necessary for the control device 100 to control the controlled object. Specifically, the support device 200 provides a development environment of a program to be executed by the control device 100 (a program creation editing tool, a parser, a compiler, and the like), a setting environment for setting parameters (configurations) of the control device 100 and various devices connected to the control device 100, a function of transmitting the created user program to the control device 100, a function of modifying/changing online the user program to be executed on the control device 100 and the like.

Further, the support device 200 provides functions such as various settings or data generation and transmission for realizing the abnormality detection processing in the control device 100.

The host server 300 is connected to the control device 100 via the local network 6 and exchanges necessary data with the control device 100. The host server 300 has, for example, a database function, and collects various data stored in the control device 100 on a regular basis or on an event basis. A general-purpose protocol such as Ethernet (registered trademark) may be implemented in the local network 6.

The display device 400 is connected to the control device 100 via the second fieldbus 4, accepts an operation from a user and transmits a command or the like corresponding to the user operation to the control device 100, and graphically displays a processing result or the like of the control device 100.

Next, the abnormality detection processing and switching of algorithms related to the abnormality detection processing in the abnormality detection system 1 according to the embodiment will be described.

Figure 2:
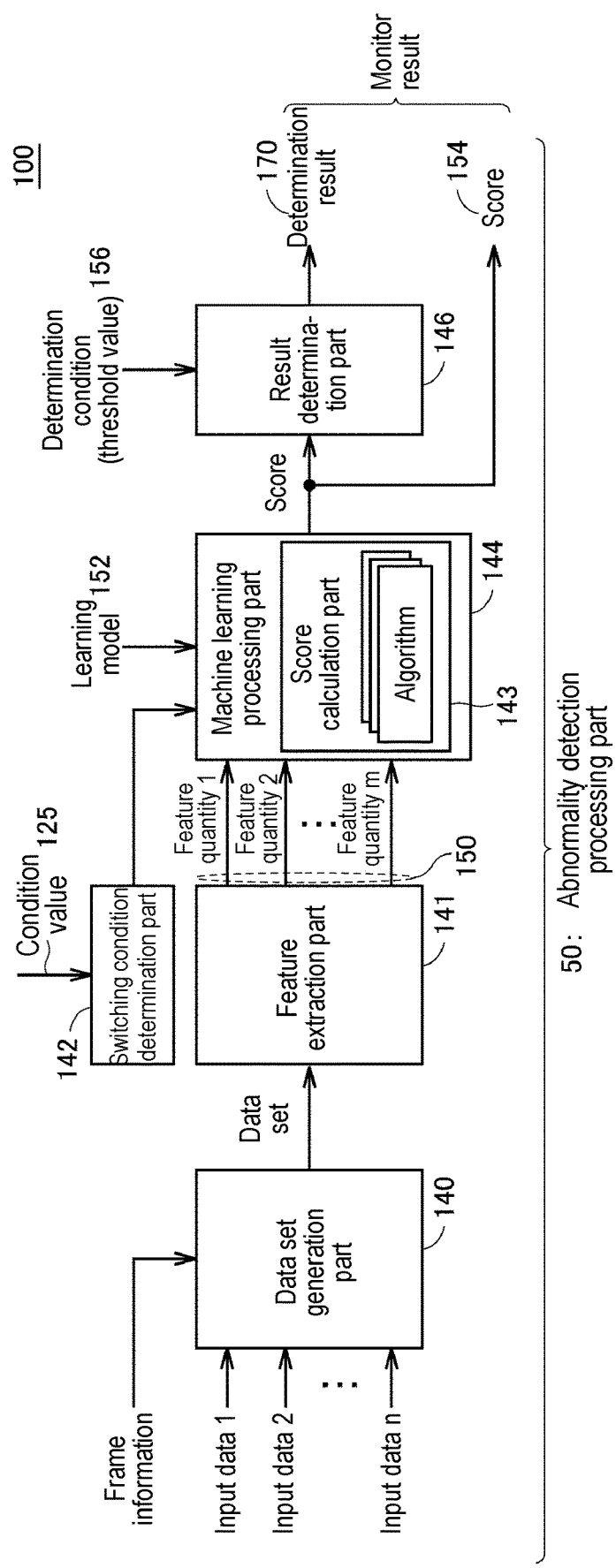
FIG. 2 is a schematic diagram showing main parts of the control device 100 according to the embodiment.

FIG. 2 is a schematic diagram showing main parts of the control device 100 according to the embodiment. With reference to FIG. 2, the control device 100 is provided with an abnormality detection processing part 50 which includes a data set generation part 140, a feature extraction part 141, a switching condition determination part 142, a machine learning processing part 144 and a result determination part 146. The machine learning processing part 144 includes a score calculation part 143 which calculates a score that is a value indicating the probability whether any abnormality is occurring in the monitored object.

The control device 100 collects one or a plurality pieces of input data (input data 1, input data 2, . . . , input data n)

from the monitored object and extracts a feature quantity, thereby outputting a monitor result including a determination result indicating whether an abnormality is occurring.

In the embodiment, the concept of a "frame" is introduced as a unit interval for determining whether any abnormality is occurring in the monitored object included in the controlled object. The frame means a unit interval for determining whether any abnormality is occurring in the monitored object. Therefore, it is determined for each frame whether any abnormality is occurring in the monitored object. The unit interval (frame) is set according to the operation of the monitored object and the like as desired.

The data set generation part 140 generates a data set including the one or plurality pieces of input data (input data 1, input data 2, . . . , input data n) from the monitored object for each frame according to the frame information.

The feature extraction part 141 extracts (calculates) one or a plurality of feature quantities 150 (feature quantity 1, feature quantity 2, . . . , feature quantity m) based on the data set generated by the data set generation part 140 and according to a predetermined processing. For example, a mean value, a maximum value, a median value, a minimum value, a standard deviation, and the like in a frame may be used as the feature quantity 150 to be calculated.

In the machine learning processing part 144, the score calculation part 143 refers to a learning model 152 prepared in advance and calculates a value (hereinafter also referred to as a "score") indicating a degree of deviation (or a deviation degree), with respect to the learning model 152, of the one or plurality of feature quantities extracted by the feature extraction part 141. Here, the learning model 152 corresponds to a set whose elements are values of features quantities labeled with a specific class (for example, normality or abnormality). Typically, the learning model 152 includes feature quantities at the normal time, and in this case, the score means a value indicating the probability whether any abnormality is occurring in the monitored object.

The machine learning processing part 144 causes the score calculation part 143 to calculate a score, which is a value indicating the deviation degree of the feature quantity with respect to a value group in a hyperspace, by executing one of a plurality types of algorithms as an algorithm for monitoring abnormalities in the control device 100. In this case, the learning model 152 represents a value group in the hyperspace, which corresponds to a "model" indicating the monitored object.

A method of detecting abnormalities based on the shortest distance from each point to a value group (k-nearest neighbor method), a local outlier factor (LoF) method for evaluating a distance including a cluster including a value group, an isolation forest (iForest) method using a score calculated from a path length and the like are known as methods of monitoring abnormalities based on the deviation degree. In the embodiment, one of the plurality types of algorithms executed by the score calculation part 143 is one of an algorithm following the LoF method and an algorithm following the iForest method. Further, the plurality types of algorithms that are executable by the score calculation part 143 are not limited to algorithms following the LoF method or the iForest method, and may include other types of algorithms such as the k-nearest neighbor method.

The switching condition determination part 142 switches the one algorithm executed by the machine learning processing part 144 according to a predetermined condition. More specifically, the switching condition determination part 142 inputs a condition value 125 in synchronization with the frame cycle, and when determining that the input condition value 125 satisfies the predetermined condition, outputs a switching instruction to the machine learning processing part 144. A value corresponding to the satisfied condition is set in the switching instruction. The machine learning processing part 144 switches (sets) the algorithm to be executed to an algorithm corresponding to the value indicated by the switching instruction from among the plurality types of algorithms.

When the method of abnormality monitoring based on the deviation degree is adopted, the learning model 152 includes a group of feature quantities acquired when the state of the monitored object is normal, and the control device 100 calculates the score, which is a value indicating the probability whether any abnormality is occurring in the monitored object, based on the deviation degree of the feature quantity of the object with respect to the feature quantity group included in the learning model 152.

The result determination part 146 compares a score 154 calculated by the score calculation part 143 with a predetermined determination condition (threshold value) 156, and determines whether any abnormality is occurring in the monitored object. The result determination part 146 outputs a determination result 170 indicating whether any abnormality is occurring. Further, the score may be output together with the determination result 170. In the embodiment, it is possible to output a set including the determination result 170 and the score as a monitor result. The output destination of the determination result 170, the score and the monitor result may include other modules (circuits, programs and the like). For example, the output may include storage in a storage device included in the control device 100 or the support device 200, display on a display included in the support device 200, or transfer via a network.

In the embodiment, the predetermined condition described above may include a condition based on the operation state of the control device 100. For example, the predetermined condition includes a condition based on a processing time required for the processing of the algorithm by the machine learning processing part 144, a condition based on the determination result 170, or a condition based on switching of the production process. In addition, the predetermined condition is not limited to these conditions. Further, the predetermined condition may be a condition based on a combination of two or more of these conditions.

With the above functional configuration, in the abnormality monitoring processing according to the embodiment, an environment is provided in which the one algorithm executed by the machine learning processing part 144 is dynamically switchable according to the predetermined condition while the control device 100 is in operation.

B. Example of Hardware Configuration

Next, examples of the hardware configurations of the main devices configuring the abnormality detection system 1 according to the embodiment will be described.

(b1: Example of Hardware Configuration of Control Device 100)

Figure 3:
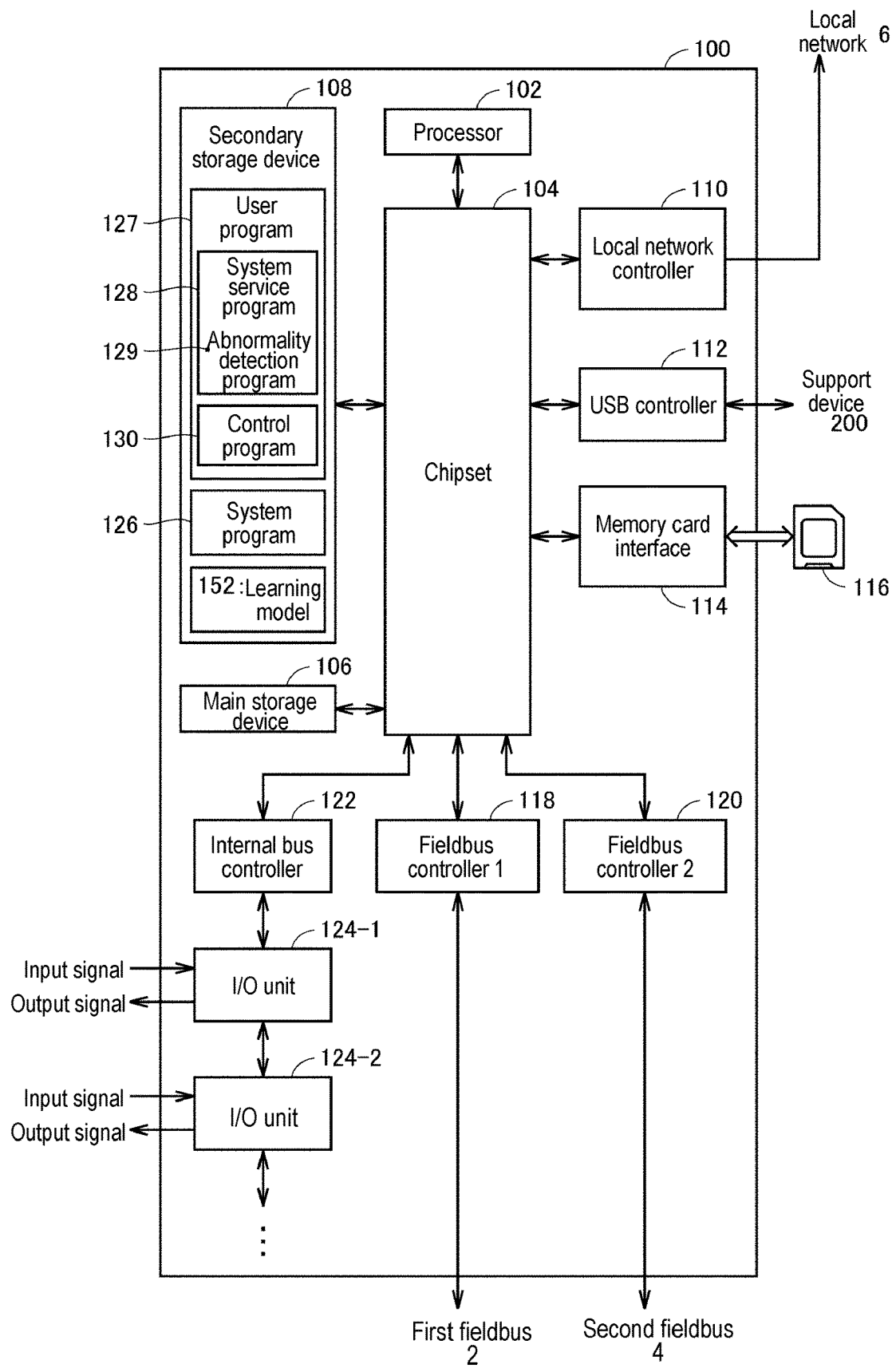
FIG. 3 is a block diagram showing an example of the hardware configuration of the control device 100 according to the embodiment.

FIG. 3 is a block diagram showing an example of the hardware configuration of the control device 100 according to the embodiment. With reference to FIG. 3, the control device 100 includes a processor 102, such as a central processing unit (CPU) or a micro-processing unit (MPU), a chipset 104, a main storage device 106, a secondary storage device 108, a local network controller 110, a universal serial bus (USB) controller 112, a memory card interface 114, an internal bus controller 122, fieldbus controllers 118 and 120, and I/O units 124-1, 124-2, . . . .

The processor 102 reads various programs stored in the secondary storage device 108 and expands them in the main storage device 106 to execute them, thereby realizing the control according to the controlled object and various processings which will be described later. The chipset 104, together with the processor 102, controls each component, thereby realizing the processing of the control device 100 as a whole.

In addition to a system program 126 for realizing functions provided by the control device 100, a user program 127 and the learning model 152 executed by using an execution environment provided by the system program 126 are stored in the secondary storage device 108. The user program 127 includes a system service program 128 for providing various services and a control program 130 for controlling the controlled object of the field device group 10. The system service program 128 includes an abnormality detection program 129 corresponding to a program module configuring the abnormality detection processing part 50 of FIG. 2.

The local network controller 110 controls the exchange of data with other devices via the local network 6. The USB controller 112 controls the exchange of data with the support device 200 via USB connection.

The memory card interface 114 is configured to allow a storage medium 116 to be attached thereto or detached therefrom, and is capable of writing data to the storage medium 116 and reading various data (a user program, trace data or the like) from the storage medium 116.

The internal bus controller 122 is an interface for exchanging data with the I/O units 124-1, 124-2, . . . mounted on the control device 100.

The fieldbus controller 118 controls the exchange of data with other devices via the first fieldbus 2. Similarly, the fieldbus controller 120 controls the exchange of data with other devices via the second fieldbus 4.

FIG. 3 shows a configuration example in which the necessary functions are provided by the processor 102 executing the programs. However, a part or all of the provided functions may be implemented by using a dedicated hardware circuit (such as an application specific integrated circuit (ASIC), a field-programmable gate array (FPGA), and the like). Alternatively, the main parts of the control device 100 may be realized by using hardware according to a general-purpose architecture (for example, an industrial personal computer based on a general-purpose personal computer). In this case, a plurality of operating systems (OSs) for different purposes may be executed in parallel by using a virtualization technique, and the necessary applications may be executed on the respective OSs.

Further, in the embodiment, the main parts of the abnormality detection processing part 50 of FIG. 2 are also realized by executing the abnormality detection program 129 by the processor 102, but one or more of the main parts of FIG. 2 may be implemented by using a dedicated hardware circuit such as an ASIC or an FPGA.

(b2: Example of Hardware Configuration of Support Device 200)

Next, the support device 200 according to the embodiment is realized, for example, by executing a program by using hardware (for example, a general-purpose personal computer) according to a general-purpose architecture.

Figure 4:
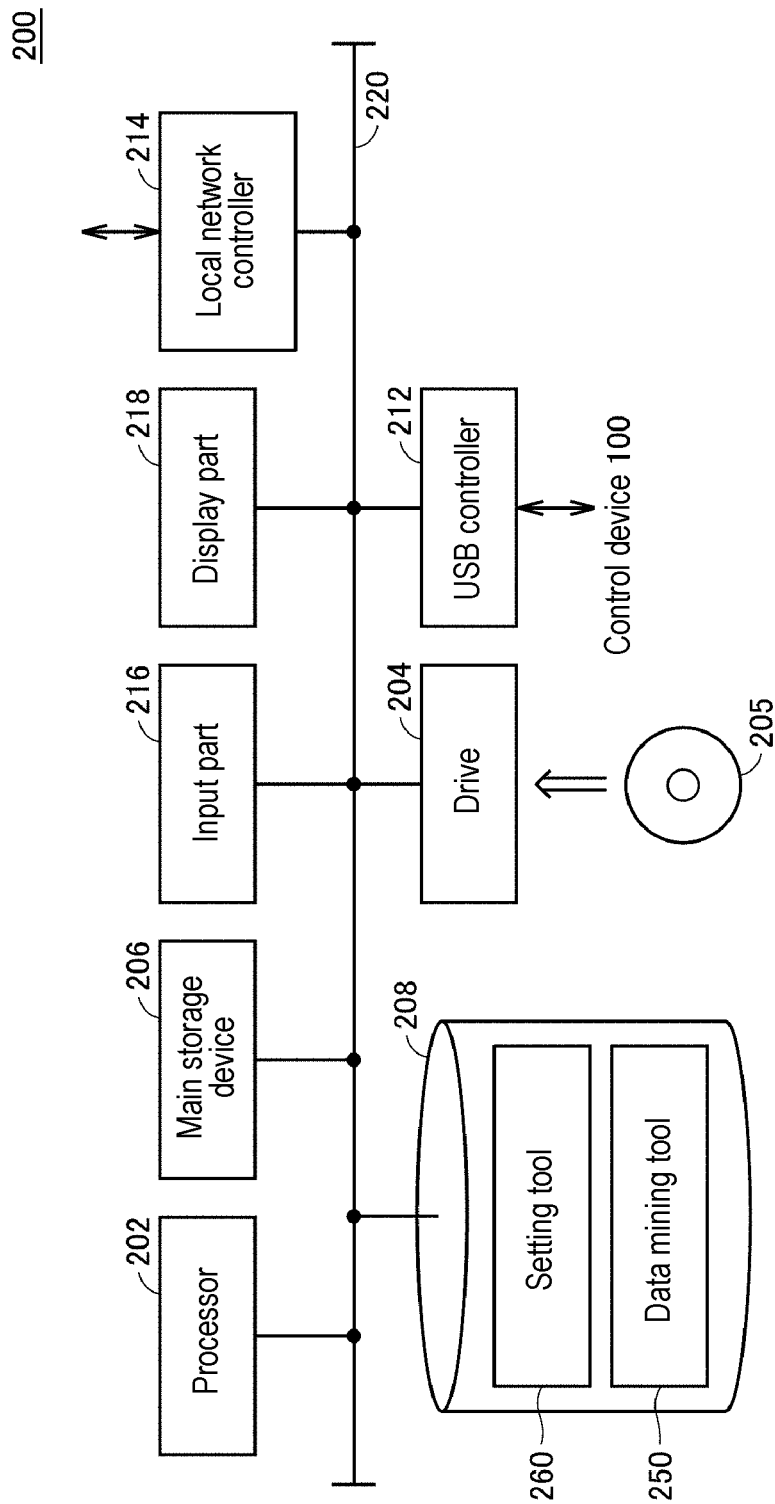
FIG. 4 is a block diagram showing an example of the hardware configuration of the support device 200 according to the embodiment.

FIG. 4 is a block diagram showing an example of the hardware configuration of the support device 200 according to the embodiment. With reference to FIG. 4, the support device 200 includes a processor 202, such as a CPU or an MPU, a drive 204, a main storage device 206, a secondary storage device 208, a USB controller 212, a local network controller 214, an input part 216 and a display part 218. These components are connected via a bus 220.

The processor 202 reads various programs stored in the secondary storage device 208 and expands them in the main storage device 206 to execute them, thereby realizing various processings which will be described later.

The secondary storage device 208 is configured by, for example, a hard disk drive (HDD), a solid state drive (SSD) or the like. The secondary storage device 208 typically stores various programs including a development program (not shown) for creating a user program executed by the support device 200, debugging the created program, defining a system configuration, setting various parameters and the like, a data mining tool 250 and a setting tool 260. The secondary storage device 208 may store the OS and other necessary programs.

The drive 204 is capable of writing data to a storage medium 205 and reading various data (a user program, trace data, time series data or the like) from the storage medium 205. The storage medium 205 includes, for example, a storage medium 205 (for example, an optical storage medium such as a digital versatile disc (DVD)) that non-transitorily stores a computer-readable program. The program or data stored in the storage medium 116 or the storage medium 205 are read therefrom and installed in an internal storage area such as the secondary storage device 208.

Various programs executed by the support device 200 may be installed via the computer-readable storage medium 116 or storage medium 205, or may be installed by downloading from a server device or the like on the network. Further, the functions provided by the support device 200 according to the embodiment may be realized by using a part of the modules provided by the OS.

The USB controller 212 controls the exchange of data with the control device 100 via USB connection. The local network controller 214 controls the exchange of data with other devices via any network.

The input part 216 is configured by a keyboard, a mouse and the like, and accepts user operations. The display part 218 is configured by a display, various indicators and the like, and outputs a processing result from the processor 202 and the like. A printer may be connected to the support device 200.

FIG. 4 shows a configuration example in which the necessary functions are provided by the processor 202 executing the programs. However, a part or all of the provided functions may be implemented by using a dedicated hardware circuit (such as an ASIC, an FPGA, and the like).

C. Example of Software Configuration/Example of Functional Configuration

Next, an example of the software configuration and an example of the functional configuration of the main devices configuring the abnormality detection system 1 according to the embodiment will be described.

Figure 5:
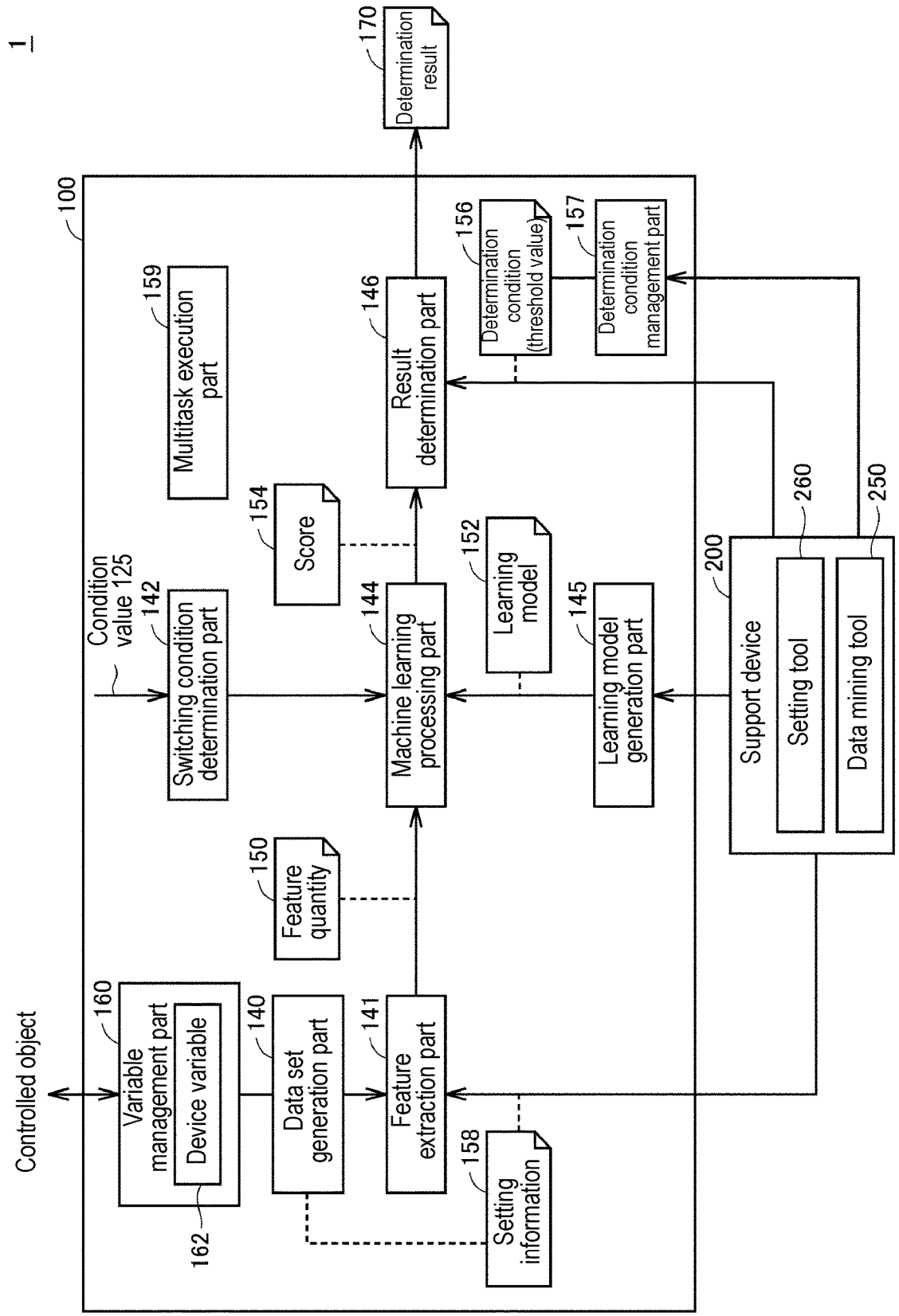
FIG. 5 is a block diagram showing an example of the basic software configuration of the abnormality detection system 1 according to the embodiment.

FIG. 5 is a block diagram showing an example of the basic software configuration of the abnormality detection system 1 according to the embodiment. With reference to FIG. 5, in the abnormality detection system 1, the control device 100 executes the abnormality detection processing based on various information provided by the support device 200. In FIG. 5, the main parts shown in FIG. 2 are shown in association with the peripheral parts thereof.

With reference to FIG. 5, the control device 100 includes a multitask execution part 159, a variable management part 160, and a determination condition management part 157 in addition to each part of the abnormality detection processing part 50 shown in FIG. 2. The multitask execution part 159 executes a plurality of tasks including a control task for performing the real-time control of the controlled object and a related processing task for performing a related processing related to the real-time control in parallel under the control of the processor 102. The details of the multitasking execution will be described later.

The variable management part 160 acquires a state value (an input value) appearing in the controlled object (the monitored object) such as a machine or a device at a predetermined control cycle, and updates the internal state value. Further, the variable management part 160 updates the command value (the output value) calculated by the execution of the user program or the like for each control cycle. That is, the variable management part 160 executes at least a part of the processing related to the I/O refresh processing, and updates the input value acquired from the controlled object and the output value given to the controlled object for each control cycle.

In the control device 100 according to the embodiment, all of the state value (the input value) acquired from the controlled object, the command value (the output value) given to the controlled object, and the data or values (all included in the "internal state value") used for the calculation processing in the control device 100 or the state management of the control device 100 are referred to in the form of "variables." Therefore, in the following description, a value that is usable in the control device 100 may be expressed as a "variable value." Then, a set of internal state values indicating the state values generated in the controlled object such as a machine or a device is expressed as a "device variable 162."

The data set generation part 140 searches the device variable(s) 162 according to the frame information for a value (a temporal change in the unit interval) indicated by one or a plurality of device variables 162 (state values) of the designated monitored object according to setting information 158 set by the support device 200, thereby generating a data set including one or a plurality pieces of input data (input data 1, input data 2, . . . , input data n) related to the monitored object for each frame.

In addition, the disclosure is not limited to the form of referring to a value by using a "variable," and may be applied to a form of designating and referring to a logical address or a physical address of a memory or the like for storing each value.

The learning model generation part 145 generates the learning model 152 according to the instruction from the support device 200. Further, the learning model generation part 145 may be provided in a part of the support device 200. In this case, the learning model 152 itself is provided from the support device 200 to the control device 100. More specifically, the learning model 152 may be generated by extracting necessary data by using the data mining tool 250 of the support device 200.

The determination condition management part 157 changes the determination condition 156 according to the switching instruction from the switching condition determination part 142 or the instruction from the setting tool 260.

The switching condition determination part 142 inputs the condition value 125, determines whether the predetermined condition is satisfied based on the input condition value 125, generates the switching instruction based on the determination result, and outputs the switching instruction to the machine learning processing part 144. The condition value 125 may include, but is not limited to, the processing time required to execute the algorithm in the machine learning processing part 144, the switching instruction of the production process, the determination value of the determination result 170, and the like.

In addition, the support device 200 sets the setting information 158 and the determination condition 156 for the control device 100. More specifically, the support device 200 has the setting tool 260, and the setting tool 260 is in charge of setting various data to the control device 100.

D. Issue and Solution

Figure 6:
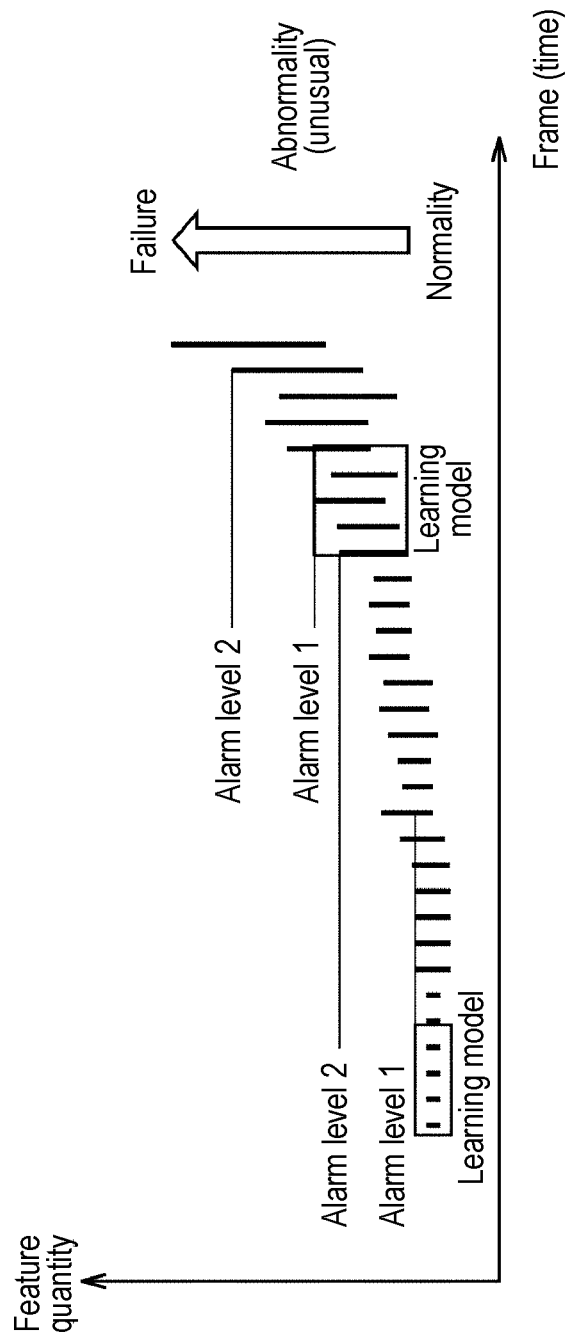
FIG. 6 is a diagram illustrating an example of definitions of the determination result 170 according to the embodiment.

Next, the issues assumed by the abnormality detection system 1 according to the embodiment and the solutions to the issues will be described. FIGS. 6 and 7 are diagrams illustrating an example of definitions of the determination result 170 according to the embodiment. FIG. 8 is a diagram showing a comparison of the performance of the algorithms according to the embodiment.

FIG. 6 shows an example of the determination result 170 calculated based on the relationship between the feature quantity acquired when the control device 100 is in operation and the learned data of the learning model 152. For example, the machine learning processing part 144 calculates a score based on the feature quantity output by the feature extraction part 141 and the learned data of the learning model 152, and the result determination part 146 compares the calculated score with the threshold value indicated by the determination condition 156. The result determination part 146 outputs the determination result 170 based on the comparison result. The determination result 170 includes, for example, the types of "normality," "abnormality," "failure," "alarm level 1," and "alarm level 2" as shown in FIG. 7, but the types are not limited thereto. Specifically, the determination result 170 indicates "normality" if the score 154 is less than the abnormality threshold value, indicates "abnormality" if the score 154 corresponds to the abnormality threshold value to the alarm level 1 threshold value, indicates "alarm level 1" if the score 154 corresponds to the alarm level 1 threshold value to the alarm level 2 threshold value, indicates "alarm level 2" if the score 154 corresponds to the alarm level 2 threshold value to the failure threshold value, and indicates "failure" if the score 154 exceeds the failure threshold value.

In FIG. 8, the processing time and the accuracy are compared and shown for each of the algorithms (LOF and iForest (isolation forest)). Specifically, the processing time required for the LOF processing accounts for a relatively large proportion of the time required for machine learning processing, but the accuracy of the calculated score 154 is high, and conversely, the processing time for iForest accounts for a relatively small proportion of the time required for machine learning processing, but the accuracy is low. As a result, there is a trade-off relationship between the processing time and the accuracy between the algorithms (LOF and iForest). Further, in the embodiment, the processing time of the algorithm represents the same concept as the execution time of the algorithm.

With reference back to FIG. 6, when the determination result 170 transitions from "normality"→"abnormality" (alarm level 1→alarm level 2)→"failure" over time as shown in FIG. 6, a demand (issue) to perform a stricter determination at the production site arises. Therefore, in this case, it is possible to meet the demand by switching to an algorithm with higher accuracy.

At the production site, there is also a request to make the control device 100 operate by using the result of the abnormality detection processing. Therefore, the control device 100 provides the determination result 170 to the control program 130 within a predetermined cycle synchronized with the control cycle. As a result, the control program 130 may control the controlled object based on the determination result 170.

On the other hand, if the processing time of the algorithm is long and the processing time of the abnormality detection processing part 50 is long, it becomes difficult to provide the determination result 170 to the control program 130 within the predetermined cycle. Therefore, in the control device 100, when the processing time of the machine learning processing part 144 becomes long, it is possible to meet the above-mentioned demand by switching to an algorithm requiring a shorter processing time.

Further, at the production site, for each workpiece, the setup is changed to switch the production process, and there is a demand to switch the algorithm to be applied as well if the workpiece is different.

Therefore, in the embodiment, it is possible to meet the above-mentioned demand by switching the algorithm according to the type of the production process.

E. Other Examples of Algorithms

The control device 100 acquires the deviation degree (the score 154) between the learning data of the learning model 152 in at least one of the normal time and the abnormal time and the feature quantity acquired from the monitored object, and determines an abnormality occurring in the monitored object based on the acquired deviation degree and the threshold value of the determination condition 156.

In the embodiment, the above-mentioned LOF or iForest is switched by using the common learning model 152, but it is also possible to switch between other algorithms different from these. Here, an example of another different algorithm will be described.

A different algorithm uses the Mahalanobis distance in acquiring the score 154. Specifically, the control device 100 calculates the score 154 (score a, score b) based on the distance between the feature quantity data of a diagnosis object of abnormality detection (hereinafter also referred to as "diagnosis target data") and k feature quantities included in aggregates sa and sb of the feature quantities. Here, the calculation time of the score a and the score b corresponds to the processing time of the algorithm.

When this different algorithm is applied, the feature quantity is generated based on a first parameter regarding the number of elements that define the feature quantity. The first parameter is a parameter for setting the types of elements (mean, standard deviation, skewness, kurtosis, maximum, minimum, and the like) and the number of elements (number of dimensions of the feature vector) that define the feature quantity. The user may set the value of the first parameter by using the data mining tool 250 of the support device 200. The score is acquired based on a second parameter regarding a range in the learning model 152, which is an aggregate of the feature quantities used for acquiring the score. The second parameter is a parameter for setting the number of feature quantities (hereinafter also referred to as a "k value") used for calculating the score among the diagnosis object data. The user may set the value of the second parameter by using the support device 200. The greater the k value, the greater the number of learned feature quantities with which the diagnosis object data is compared.

Figure 9:
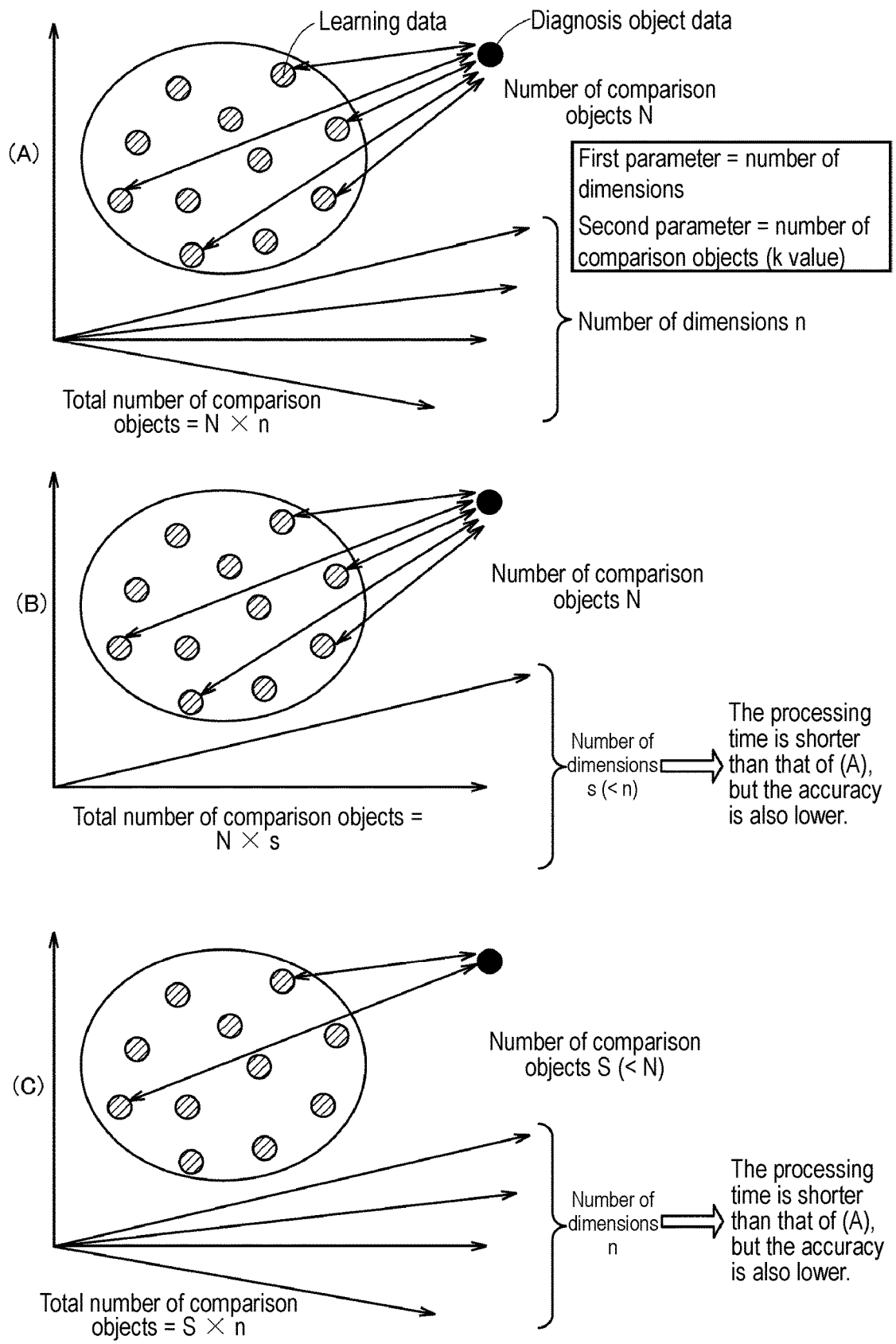
FIG. 9 is a schematic diagram for illustrating a change in acquisition time of the deviation degree according to the embodiment.

Here, in the embodiment, the score calculation time changes according to the value of the first parameter and the value of the second parameter, respectively, but here, the first parameter is a constant value. This point will be described with reference to FIG. 9. FIG. 9 is a schematic diagram for illustrating a change in acquisition time of the score according to the embodiment.

In the example of (A) of FIG. 9, the number of dimensions is set to n as the value of the first parameter, and the k value is set to N as the value of the second parameter. In this case, the number of data as the comparison object of the diagnosis object data is conceptually the product of the number of comparison objects N and the number of dimensions n.

In the example of (B) of FIG. 9, the number of dimensions is set to s (s is a value less than n) as the value of the first parameter, and the k value is set to N as the value of the second parameter. In this case, the number of data as the comparison object of the diagnosis object data is conceptually the product of the number of comparison objects N and the number of dimensions s. Regarding the number of dimensions, since s is a value less than n, the total number of comparison objects in the example of (B) of FIG. 9 is less than the total number of comparison objects in the example of (A) of FIG. 9. Therefore, the processing time for calculating the score is shortened by that amount, but the accuracy of the score becomes lower.

In this way, the user may shorten or lengthen the calculation time of the score by changing the value of the second parameter in a trade-off with the accuracy of abnormality detection.

In the example of (C) of FIG. 9, the number of dimensions is set to n as the value of the first parameter, and the k value is set to S (S is a value less than N) as the value of the second parameter. In this case, the total number of comparison objects is conceptually the product of the number of comparison objects S and the number of dimensions n. Regarding the k value, since S is a value less than N, the total number of comparison objects in the example of (C) of FIG. 9 is less than the total number of comparison objects in the example of (A) of FIG. 9. Therefore, the processing time for calculating the score is shortened by that amount, but the accuracy of the score becomes lower.

When the k value is set by the second parameter, the learned feature quantities used in the score calculation are selected in descending order of reliability. In this way, the user may shorten or lengthen the calculation time of the score by changing the value of the second parameter in a trade-off with the accuracy of the score, that is, the accuracy of abnormality detection. That is, the second parameter is a parameter that may shorten the processing time of the algorithm for calculating the score.

According to FIG. 9, the learning model 152 is an aggregate of feature quantities (learning data) generated from the data acquired from the monitored object and defined by one or more elements, and the control device 100 controls the machine learning processing part 144 so that the second parameter regarding the range in the aggregate of the feature quantities used for calculating the score 154 is inherited by an algorithm after switching. In this way, even in the case of FIG. 9, a common learning model 152, which is an aggregate of learned feature quantities (learning data) whose range is defined by the second parameter, may be applied between the algorithms.

F. Cyclic Execution of Program

Next, the cyclic execution of a program according to the embodiment will be described.

Figure 10:
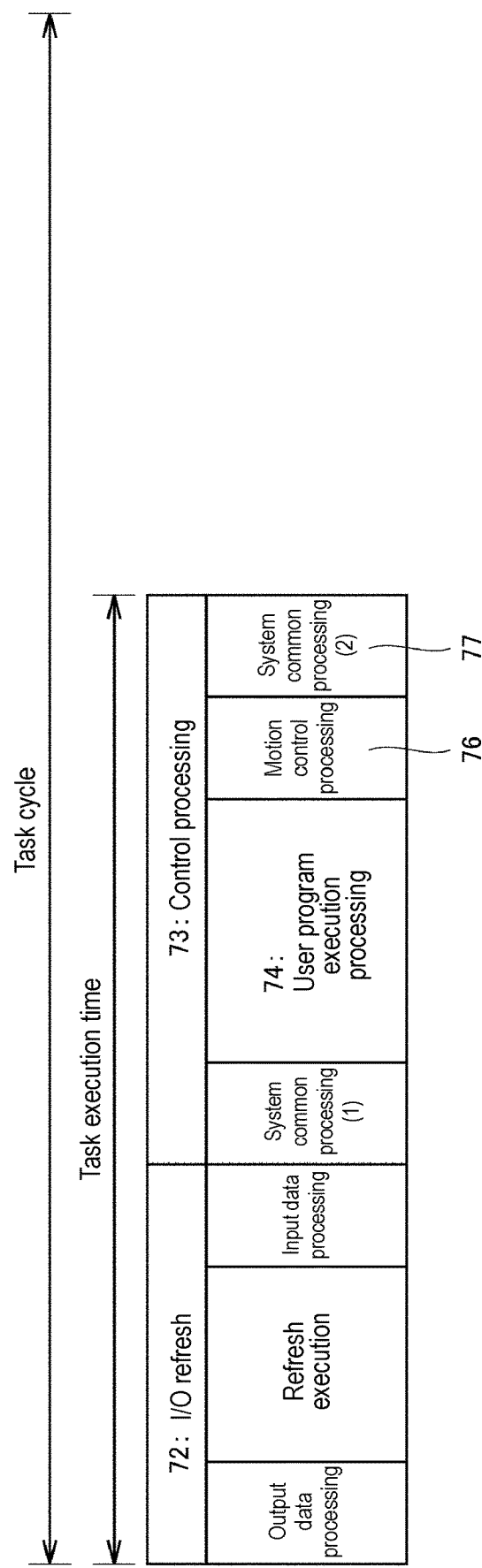
FIG. 10 is a schematic diagram showing an example of cyclic execution of a program according to the embodiment.
Figure 11:
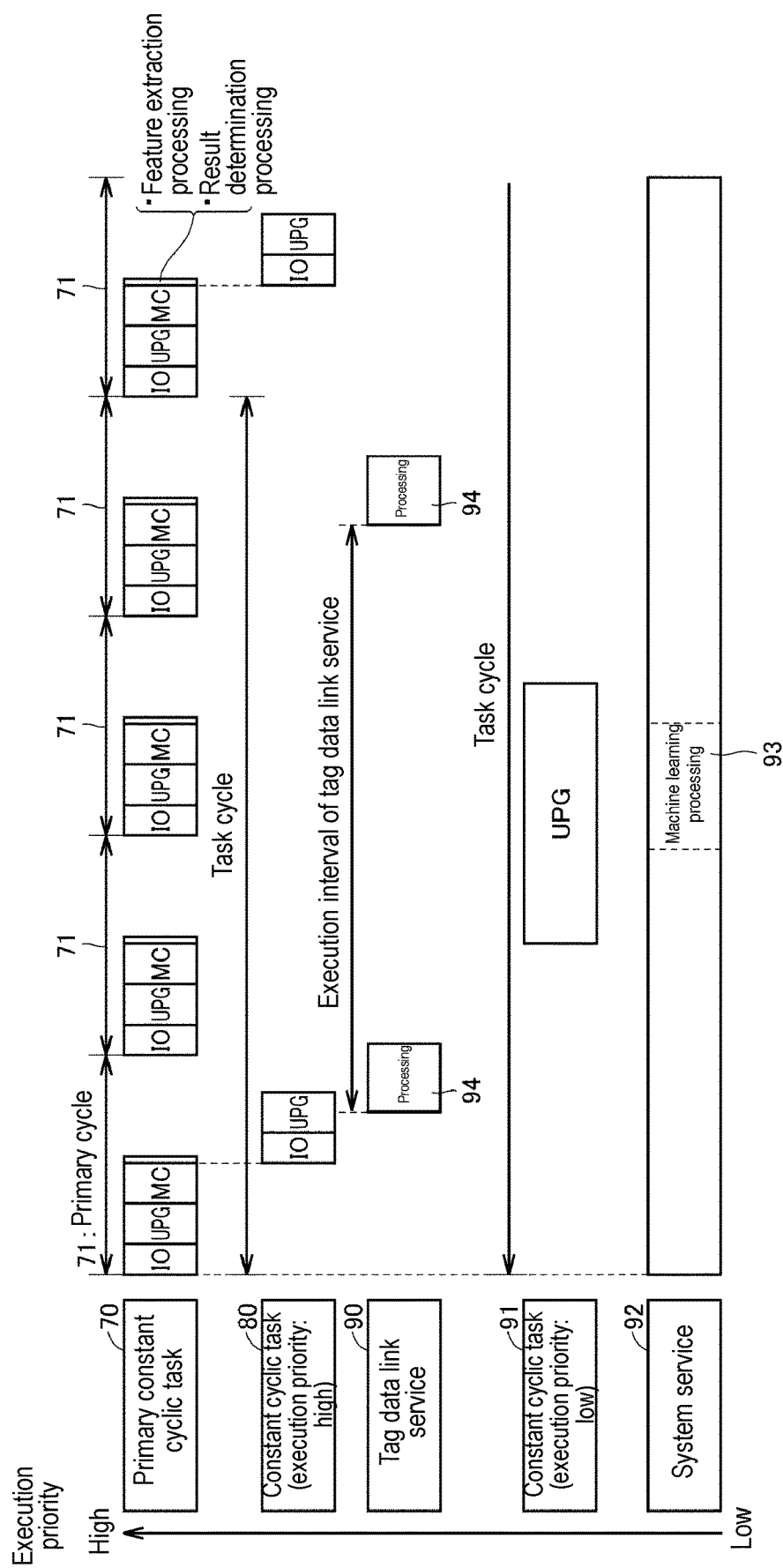
FIG. 11 is a schematic diagram showing an example of cyclic execution of a program according to the embodiment.

FIGS. 10 and 11 are schematic diagrams showing an example of cyclic execution of a program according to the embodiment. The multitask execution part 159 of the control device 100 executes one or a plurality of processings in a multitask manner according to a pre-assigned execution priority in unit of tasks.

With reference to FIG. 10, the task is repeatedly executed in a constant task cycle synchronized with the control cycle, and the tasks of an I/O refresh processing 72 and a control processing 73 subsequent to the I/O refresh processing 72 are executed within the task execution time of each task cycle. The I/O refresh processing 72 means a processing in which the variable management part 160 cyclically updates the value of the corresponding variable of the device variable 162.

The control processing 73 is a task executed by the control program 130, and includes the tasks of a system common processing (1) and a system common processing (2) 77, a user program execution processing 74, and a motion control processing 76. The user program execution processing 74 is a program created as desired according to the controlled object included in the user program 127, and includes a sequence program and the like described in the language defined in IEC61131-3. The motion control processing 76 includes a processing according to a motion instruction included in the user program 127 (typically, a processing regarding the position control and the speed control of a motor).

FIG. 11 shows an example in which the tasks of a primary constant cyclic task 70, a constant cyclic task 80, a tag data link service 90, a constant cyclic task 91, and a system service 92, which are the control tasks for performing the real-time control of the controlled object, are executed. The system service 92 corresponds to a related processing task for performing a related processing related to the real-time control. In the figure, "IO" indicates the I/O refresh processing, "UPG" indicates the user program execution processing, and "MC" indicates the motion control processing.

The primary constant cyclic task 70 includes a processing to be executed in the control device 100 with the highest priority (top priority) as compared with other tasks, and is cyclically executed every primary cycle 71 corresponding to the control cycle.

More specifically, the primary constant cyclic task 70 includes the I/O refresh processing 72, the user program execution processing 74, the motion control processing 76, and the system common processing (2) 77. The system common processing (2) 77 of the primary constant cyclic task 70 includes a processing executed by the data set generation part 140, a feature extraction processing executed by the feature extraction part 141, and a result determination processing executed by the result determination part 146.

In the primary constant cyclic task 70, all of the I/O refresh processing 72, the user program execution processing 74, and the motion control processing 76 are executed every primary cycle 71.

The constant cyclic task 80 includes a processing having a lower priority than the primary constant cyclic task 70, and is executed every constant task cycle corresponding to an integer multiple of the control cycle.

More specifically, like the primary constant cyclic task 70, the constant cyclic task 80 includes an I/O refresh processing, a user program execution processing, and a motion control processing. Except for the fact that the execution cycle is different, the processing contents of the I/O refresh processing, the user program execution processing, and the motion control processing of the constant cyclic task 80 are the same as the processing contents of the I/O refresh processing 72, the user program execution processing 74, and the motion control processing 76.

The tag data link service 90 includes a processing 94 having a lower priority than the constant cyclic task 80. For example, the tag data link service 90 includes a processing of storing the one or plurality pieces of input data referred to by the data set generation part 140 and the one or plurality of feature quantities generated by the feature extraction part 141 in a storage area such as the main storage device 106 or the secondary storage device 108. That is, the task of the tag data link service 90 is assigned a processing of storing the data generated by the feature extraction processing that is assigned to the primary constant cyclic task 70.

The constant cyclic task 91 executes the task of the user program 127, which has a lower priority than the task of the tag data link service 90.

The system service 92 includes a processing having a lower priority than the constant cyclic task 91, and includes, for example, a machine learning processing 93 performed by the machine learning processing part 144 including calculation of the score 154 and various file transfer processings.

In FIG. 11, the feature quantity acquired by the feature extraction processing executed in the primary cycle 71 is set in the device variable 162. The machine learning processing 93 of the system service 92 calculates the score 154 by executing the algorithm by using the feature quantity set in the device variable 162. The calculated score 154 is set in the device variable 162. The result determination processing executed in the next primary cycle 71 outputs the determination result 170 based on the score 154 set in the device variable 162. The determination result 170 is set in the device variable 162. Therefore, in the user program execution processing 74 or the motion control processing 76 executed in the next primary cycle 71, it is possible to control the controlled object based on the determination result 170 of the result determination processing executed in advance.

In the embodiment, as a predetermined condition for switching the algorithm so that such a control routine may be maintained, when the processing time of the algorithm exceeds the time based on the above-mentioned primary cycle 71, it may be switched to another algorithm with a shorter processing time.

G. User Program

Next, an example of the user program will be described. The user program is described, for example, in a function block diagram according to the language defined in the IEC 61131-3 standard. FIG. 12 is a diagram illustrating a function block 121 of the machine learning processing according to the embodiment. In the following description, the function block is also referred to as the FB. The FB 121 of (A) of FIG. 12 implements, for example, one or a plurality of operations implemented by the machine learning processing part 144 as one or a plurality of functions. The FB 121 has two input variables (Execute, Algorithm) as shown in (B) of FIG. 12 and six output variables (Done, Busy, Error, ErrorID, Time, WarningLevel) as shown in (C) of FIG. 12. These input and output variables correspond to certain storage areas, and the values in the recording area may be referred to by other FBs in the function block diagram or the components that configure the diagram.

The input variable Execute sets data that instructs the start of processing in the FB 121. Further, the input variable Algorithm is set with a value that designates the type of algorithm executed by the machine learning processing part 144. For example, if the value of the input variable Algorithm is "0," the LoF algorithm is designated, and if the value is "1," the iForest algorithm is designated.

The FB 121 is activated when a value instructing the start of processing is set in the input variable Execute. When activated, the FB 121 (i) calculates the score 154 by executing the algorithm designated by the input variable Algorithm based on the feature quantity extracted by the feature extraction part 141 and the learning model 152 and (ii) accepts the determination result 170 calculated by the result determination processing based on this score 154 and sets the accepted determination result 170 in the output variable WarningLevel. The output variable WarningLevel is set to "0" when the determination result 170 indicates normality, set to "1" when it indicates abnormality, and set to "2" when it indicates failure. The FB 121 further (iii) measures (calculates) the algorithm processing time from the start of execution of the algorithm designated by the input variable Algorithm to the calculation of the score 154, and sets the measured processing time in the output variable Time. Therefore, the output variable Time also represents the processing time of the machine learning processing part 144. Further, the FB 121 may also measure the total processing time required for the processing for generating the determination result 170 based on the processing time of the algorithm and the score 154, and set the measured processing time in the output variable Time.

Further, the FB 121 sets "True" in the output variable Done when the machine learning processing is completed, that is, when the execution of the function of the FB 121 is completed. Further, the FB 121 sets "True" in the output variable Busy during the execution of the function, but sets "1" when the function is completed. Further, when an error is detected during execution, the FB 121 sets "True" in the output variable Error, generates an error code indicating the type of error, and sets it in the output variable ErrorID.

A value that designates LOF or iForest is set in the input variable Algorithm of the FB 121 in (A) of FIG. 12, but a value that designates another type of algorithm as shown in FIG. 9 may be set.

(g1: Change of Algorithm According to Processing Time)

Figure 13:
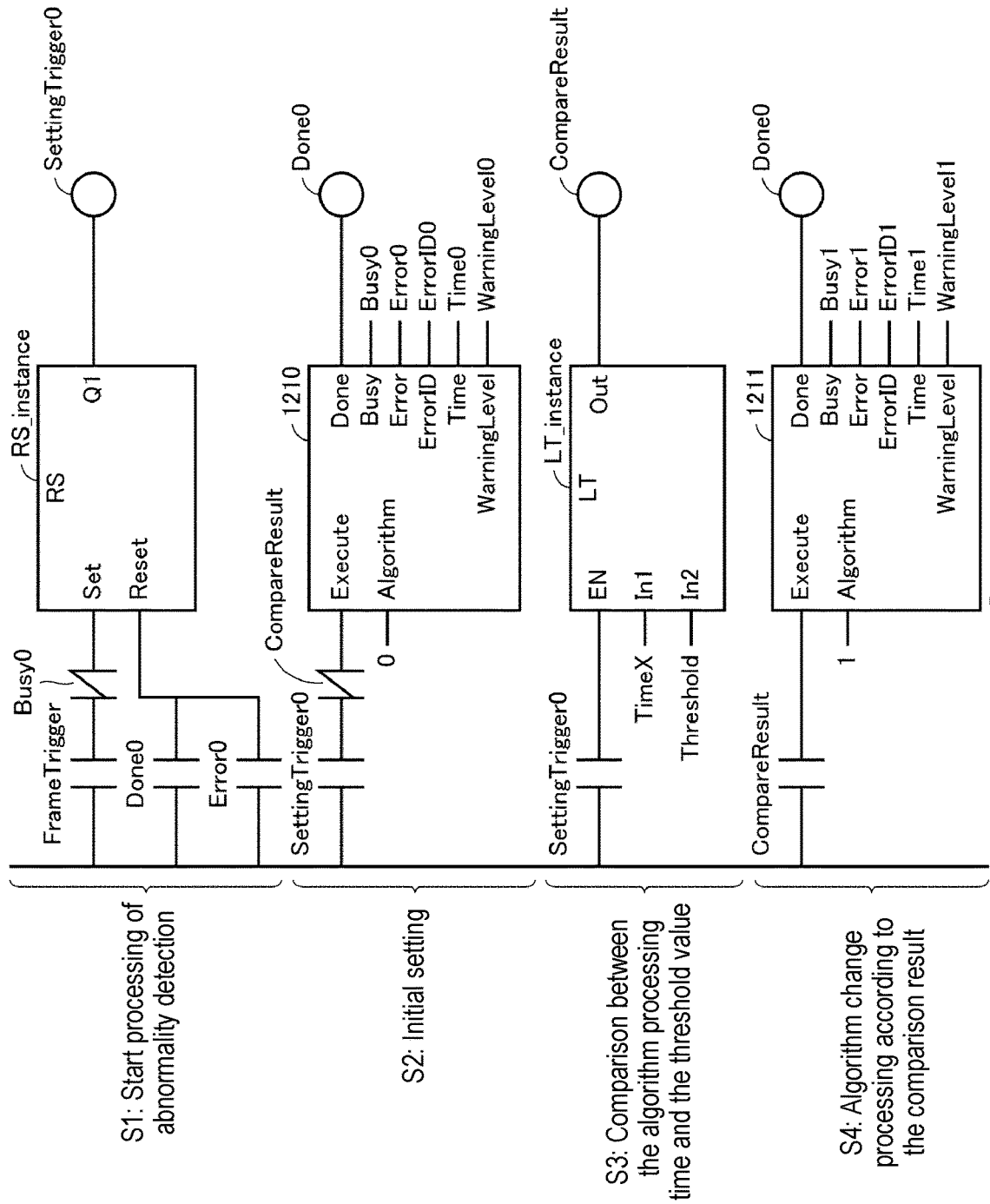
FIG. 13 is a diagram schematically showing an example of the user program for the abnormality detection processing according to the embodiment.

FIG. 13 is a diagram schematically showing an example of the user program for the abnormality detection processing according to the embodiment. More specifically, the user program of FIG. 13 shows a processing of switching the algorithm used for the machine learning processing according to a condition based on the processing time of the algorithm (the processing time required to execute the algorithm).

With reference to FIG. 13, the user program includes a step S1 for detecting the processing start of the abnormality detection in synchronization with the frame, a step S2 for performing the initial setting of the abnormality detection processing, a step S3 for performing the comparison of the processing time of the algorithm in the abnormality detection processing with the threshold value, and a step S4 for performing the change of the algorithm according to the result of the comparison. The steps S2 and S4 correspond to the processings of the machine learning processing part 144 and the result determination part 146, and the step S3 corresponds to the processing of the switching condition determination part 142. In the embodiment, the abnormality detection processing is repeatedly executed by repeatedly executing the steps S1 to S4 in synchronization with the frame.

First, in the step S1, the function block RS_instance for determining whether the abnormality detection processing can be started is executed. When executed, the function block RS_instance sets or resets the variable SettingTrigger indicating the start of the abnormality detection processing to "True" (starting the processing in and after the step S2).

More specifically, when the initial setting processing (the step S2) is not being executed at the start of the frame, that is, when "True" is set in the variable FrameTrigger and "False" is set in the variable Busy0, "True" is set in the variable SettingTrigger (processing can be started). On the other hand, when the initial setting processing (the step S2) is not being executed at the start of the frame, that is, when "True" is set in the variable FrameTrigger and "False" is set in the variable Busy0, "False" is set in the variable SettingTrigger (processing cannot be started).

Further, in the function block RS_instance, when an error occurs in the machine learning processing in the steps S2 or S4 (to be described later), or when the machine learning processing is completed, that is, when "True" is set in the variable Error0, or when "True" is set in the variable Done0, the variable SettingTrigger is reset. Therefore, in the step S1, it is possible to determine that the processing in and after the step S2 is started at each start of the frame.

In the next step S2, the FB 1210 of the machine learning processing is executed. The FB 1210 executes an algorithm (for example, LOF) designated by the value "0" of the input variable Algorithm and performs the machine learning processing when "True" is set in the variable SettingTrigger and "False" is set in the variable CompareResult (to be described later). In this way, a value indicating the determination result 170 based on the score 154 calculated by the feature quantity acquired in the corresponding frame is set in the variable WarningLevel0, and the processing time of the algorithm is set in the variable Time0, and the value "True" indicating the completion of the machine learning processing of the step S2 is set in the variable Done0.

In the next step S3, the function block LT_instance that compares the processing time of the algorithm set in the variable TimeX (in the case of FIG. 13, the variable Time® or the variable Time1) with the threshold value set in the variable threshold is executed. The function block LT_instance compares the value of the variable TimeX with the value of the variable threshold when "True" is set in the variable SettingTrigger, that is, at the start of the frame, and sets the result of the comparison in the variable CompareResult. The function block LT_instance sets "True" in the variable CompareResult when the value of the variable TimeX is greater than or equal to the threshold value of the variable threshold, and sets "False" in the variable CompareResult when the value of the variable TimeX is less than the threshold value.

In the next step S4, the FB 1211 of the machine learning processing is executed. The FB 1211 is executed when "True" is set in the variable CompareResult, that is, when the processing time of the algorithm (for example, LOF) set in the initial setting processing (the step S2) exceeds the threshold value. When executed, the FB 1211 executes an algorithm (for example, iForest) designated by the value "1" of the input variable Algorithm. In this way, a value indicating the determination result 170 based on the score 154 calculated by the feature quantity acquired in the corresponding frame is set in the variable WarningLevel1, and the processing time of the algorithm is set in the variable Time1, and in addition, the value "True" indicating the completion of the machine learning processing of the step S4 is set in the variable Done0.

By executing the user program of FIG. 13, for example, an initial algorithm (for example, LOF) is set as the algorithm for the machine learning processing; after that, when the processing time of the algorithm exceeds the threshold value, the initial algorithm is switched to another algorithm (for example, iForest) which accounts for a shorter processing time in the machine learning processing.

Further, the value of the variable threshold is, for example, a time based on the primary cycle 71, and may include, for example, an integer multiple of the primary cycle 71. In this way, the determination result 170 of the output variable WarningLevel0 or WarningLevel1 of the FB 1210 or the FB 1211 may be provided to the task of the control processing 73 at a timely timing synchronized with the primary cycle 71.

(g2: Change of Algorithm According to Determination Result)

Figure 14:
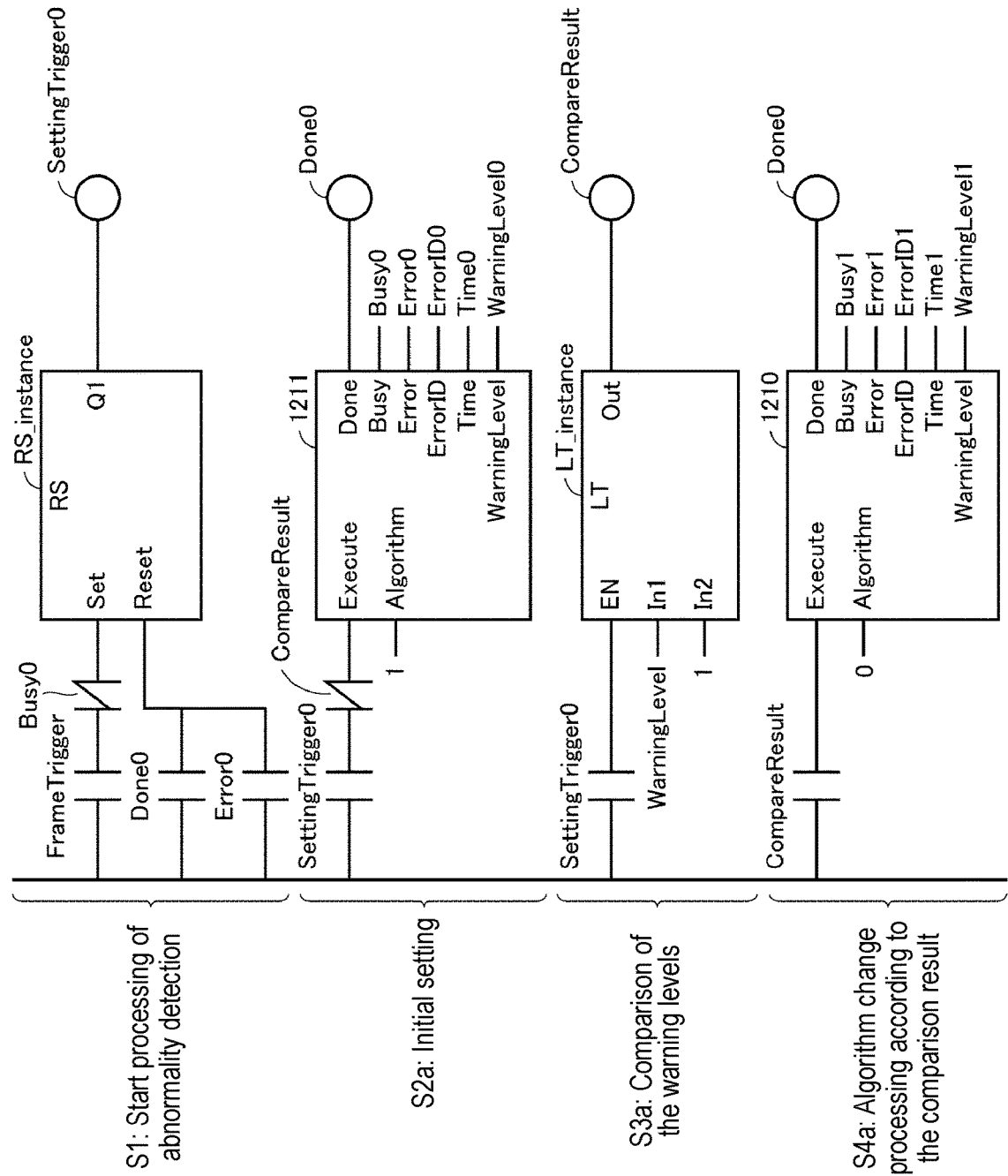
FIG. 14 is a diagram schematically showing another example of the user program for the abnormality detection processing according to the embodiment.

FIG. 14 is a diagram schematically showing another example of the user program for the abnormality detection processing according to the embodiment. More specifically, the user program of FIG. 14 shows a processing of switching the algorithm used for the machine learning processing according to a condition based on the determination result 170 (normality, abnormality, failure and the like) based on a score. Like FIG. 13, the user program of FIG. 14 may also be described by the function block diagram including the FB shown in FIG. 12.

With reference to FIG. 14, the user program includes a step S1 for detecting the processing start of the abnormality detection in synchronization with the frame, a step S2a for performing the initial setting of the abnormality detection processing, a step S3a for performing the comparison of the value of the variable WarningLevel (WarningLevel0 or WarningLevel1) indicating the determination result 170 of the abnormality detection processing with the threshold value "1," and a step S4a for performing the change of the algorithm according to the result of the comparison. The steps S2a and S4a correspond to the processings of the machine learning processing part 144 and the result determination part 146, and the step S3a corresponds to the processing of the switching condition determination part 142. In the embodiment, the abnormality detection processing is repeatedly executed by repeatedly executing the steps S1 to S4a in synchronization with the frame.

First, in the step S1, it is determined whether the abnormality detection processing can be started in synchronization with the start of the frame. Since this processing is the same as the processing of the step S1 of FIG. 13, the description is not repeated.

In the initial setting processing of the next step S2a, the FB 1211 of the machine learning processing is executed. Since the FB 1211 provides the same function as the FB 1211 of FIG. 13, the description will not be repeated. By executing the initial setting processing of the step S2a, for example, the algorithm iForest corresponding to the value "1" of the variable algorithm is executed, and the value indicating the determination result 170 based on the score calculated by the algorithm iForest is set in the variable WarningLevel0, and the processing time of the algorithm is set in the variable Time0, and in addition, the value "True" indicating the completion of the machine learning processing of the step S2a is set in the variable Done0.

In the next step S3a, the function block LT_instance that compares the value (normality "0," abnormality "1," and failure "2") set in the variable WarningLevel (in the case of FIG. 14, the variable WarningLevel0 or the variable WarningLevel) with the threshold "1" is executed. The function block LT_instance compares the value of the variable WarningLevel with the threshold value "1" when "True" is set in the variable SettingTrigger, that is, at the start of the frame, and sets the result of the comparison in the variable CompareResult. For the variable CompareResult, the function block LT_instance sets "True" in the variable CompareResult when the value of the variable WarningLevel exceeds the threshold value "1," that is, when the determination result 170 indicates "failure," and sets the variable CompareResult to "False" when it is less than the threshold value, that is, when the determination result 170 indicates "normality" or "abnormality."

In the next step S4a, the FB 1210 of the machine learning processing is executed. Since the FB 1210 provides the same function as the FB 1210 of FIG. 13, the description will not be repeated. In the step S4a, the FB 1210 is executed when "True" is set in the variable CompareResult in the step S3a, that is, when the determination result 170 of abnormality detection by the algorithm (for example, iForest) set in the initial setting processing (the step S2) indicates "failure." When executed, the FB 1210 performs the machine learning processing that executes an algorithm (for example, LOF) designated by the value "0" of the input variable Algorithm. When the machine learning processing of the FB 1210 in the step S4a is completed, a value indicating the determination result 170 based on the score 154 acquired in the corresponding frame is set in the variable WarningLevel1, and the processing time of the algorithm is set in the variable Time1, and in addition, the value "True" indicating the completion of the machine learning processing is set in the variable Done0.

By executing the user program of the abnormality detection processing of FIG. 14 as described above, for example, an initial algorithm (for example, iForest) is set as the algorithm for the machine learning processing; after that, when the determination result 170 exceeds the threshold value (for example, the value of "abnormality"), the initial algorithm may be switched to another algorithm with higher accuracy (for example, LOF).

(g3: Change of Algorithm According to Switching of Production Process)

Figure 15:
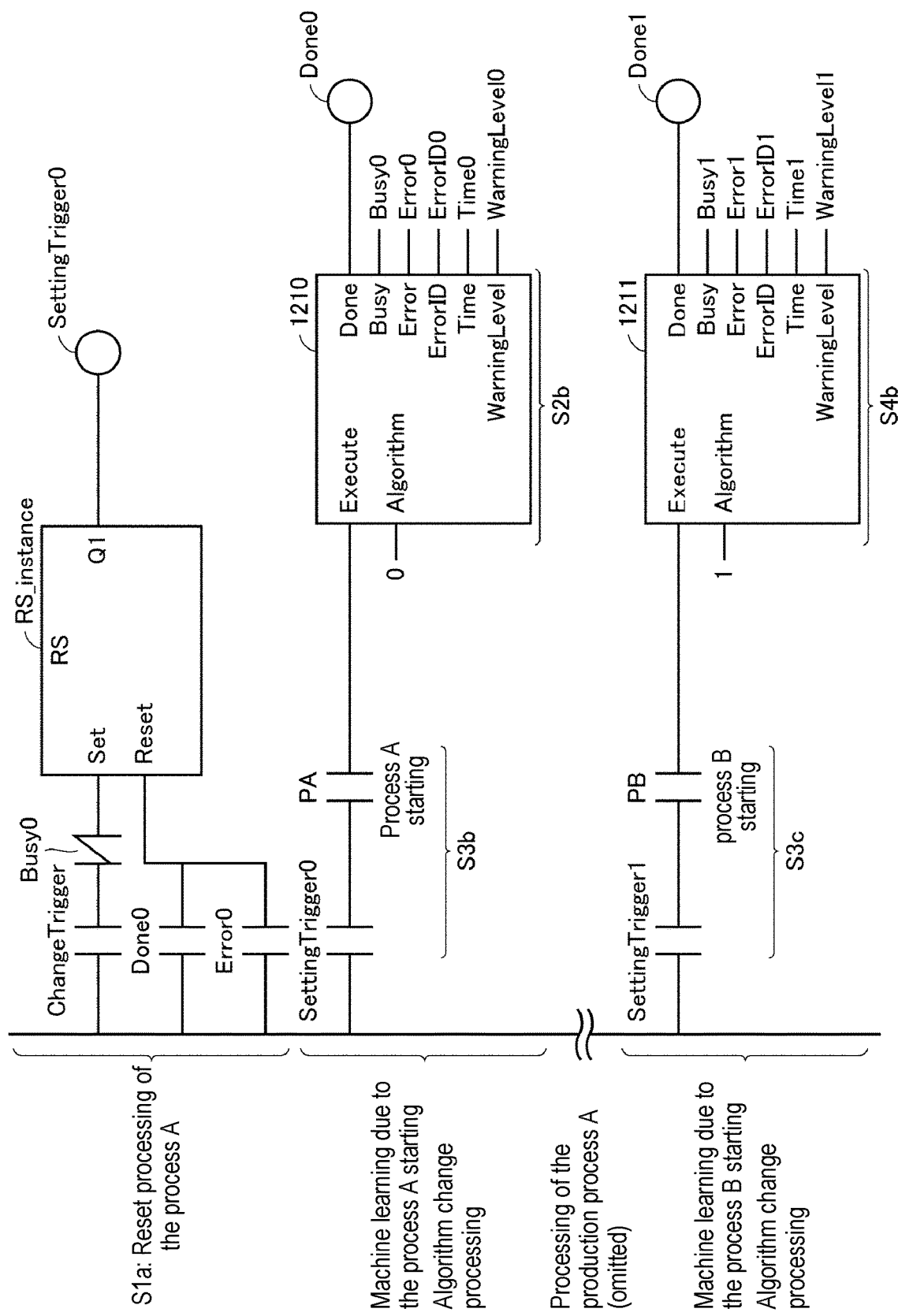
FIG. 15 is a diagram schematically showing still another example of the user program for the abnormality detection processing according to the embodiment.

FIG. 15 is a diagram schematically showing still another example of the user program for the abnormality detection processing according to the embodiment. Specifically, the user program of FIG. 15 shows a processing of switching the algorithm used for the machine learning processing according to a condition based on the switching of a production process. Like FIG. 13 or FIG. 14, the user program of FIG. 15 may also be described by the function block diagram including the FB shown in FIG. 12. Here, the production processes include, for example, a process A and a process B, and a case in which the process A is switched to the process B will be described.

With reference to FIG. 15, the user program includes a step S1a for performing the reset processing of the process A, a step S2b for performing the abnormality detection processing for the process A, a step S3b for detecting the start of execution of the process A, a step S4b for performing the abnormality detection processing for the process B, and a step S3c for detecting the start of the execution of the process B. The steps S2b and S4b correspond to the processings of the machine learning processing part 144 and the result determination part 146, and the steps S3b and S3c correspond to the processing of the switching condition determination part 142.

First, in the step S1a, the function block RS_instance is executed when "True" is set in the trigger variable ChangeTrigger for switching to the process A and "False" is set in the variable Busy0. As a result, "True" is set in the variable SettingTrigger0 that allows switching to the process A.

Next, in the step S3b, when it is determined that "True" is set in the variable SettingTrigger0 and "True" is set in the variable PA instructing the start of the process A, that is, when it is determined that the condition for switching to the production process A is satisfied, the determination result "True" is set in the input variable Execute of the FB 1210 in the step S2b.

In the step S2b, the FB 1210 is executed. The FB 1210 in the step S2b performs the machine learning processing by executing an algorithm (for example, LOF) designated by the value "0" of the input variable Algorithm. Since in the step S2b, the same processing as that of the FB 1210 shown in FIG. 13 or FIG. 14 is executed, the description will not be repeated. After that, the processing of the process A is executed.

Further, in order to switch from the process A to the process B, a reset processing (not shown) of the process B is performed in the same manner as in the step S1a. By the reset processing of the process B, "True" is set in the variable SettingTrigger1 that allows switching to the process B.

Next, in the step S3c, when it is determined that "True" is set in the variable SettingTrigger1 and "True" is set in the variable PB instructing the start of the process B, that is, when it is determined that the condition for switching to the production process B is satisfied, the determination result "True" is set in the input variable Execute of the FB 1211 in the step S4b.

In the step S4b, the FB 1211 is executed. The FB 1211 in the step S4b performs the machine learning processing by executing an algorithm (for example, iForest) designated by the value "1" of the input variable Algorithm. Since in the step S4b, the same processing as that of the FB 1211 shown in FIG. 13 or FIG. 14 is executed, the description will not be repeated. After that, the processing of the process B is executed.

By executing the user program of the abnormality detection processing of FIG. 15 as described above, the algorithm for the machine learning processing may be switched to the algorithm according to the process after the switching each time the process is switched.

In the embodiment, the learning model 152 is commonly used between the algorithms even if the algorithms are switched. That is, since the learning model 152 may be inherited by the algorithm after the switching, the algorithm switching system may be easily introduced to the production site.

H. Switching of Determination Condition

Figure 16:
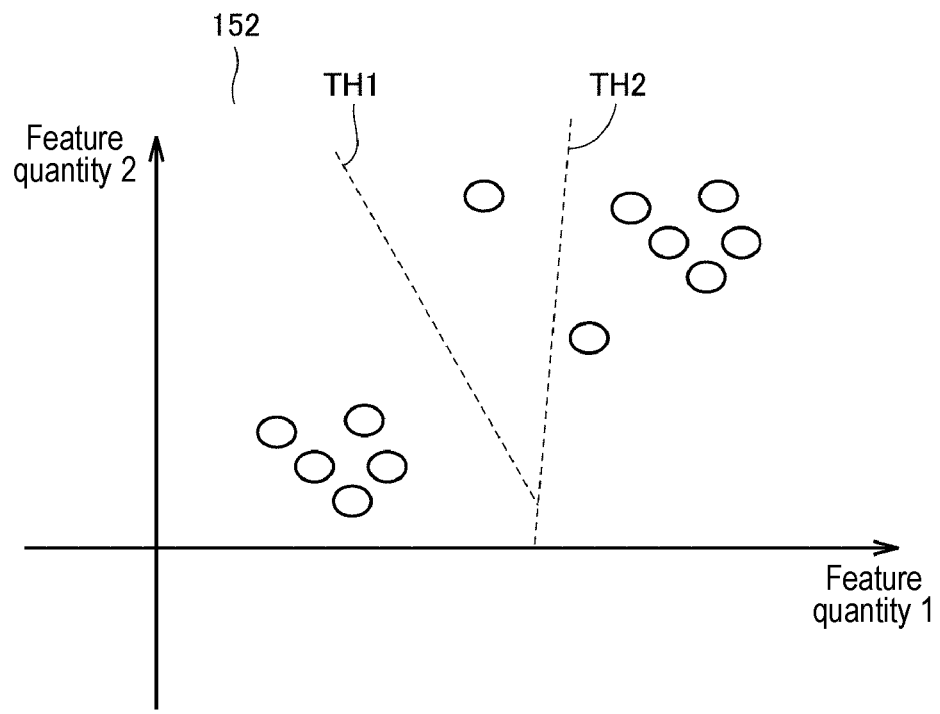
FIG. 16 is a diagram illustrating switching of determination conditions according to the embodiment.

In the embodiment, as shown in FIG. 16, it is also possible to change the threshold value of the determination condition 156 according to the algorithm in the space of the learning model 152.

FIG. 16 is a diagram illustrating switching of determination conditions according to the embodiment. FIG. 16 schematically shows a space including feature quantities labeled with a specific class (for example, normality or abnormality) configured by the learning model 152. The space of FIG. 16 is, for example, a two-dimensional space defined by two types of feature quantities 1 and 2. If the learning model 152 of FIG. 16 includes feature quantities at the normal time, the score 154 means a value indicating the probability whether any abnormality is occurring in the monitored object.

In FIG. 16, for example, two types of threshold values TH1 and TH2 are shown as threshold values of the determination condition 156 for determining normality and abnormality. In the embodiment, it is possible to adopt a configuration in which the threshold value applied as the determination condition 156 is switched according to the algorithm used for the machine learning processing part 144.

Specifically, when the algorithm LOF is executed in the machine learning processing part 144, for example, the result determination part 146 makes one of the threshold values TH1 and TH2 valid (the threshold value used for the result determination) and makes the other one invalid (the threshold value not used for the result determination); when the algorithm iForest is executed in the machine learning processing part 144, one of the threshold values TH1 and TH2 is made invalid, and the other is made valid.

According to FIG. 16, by changing the threshold value of the determination condition 156, even if the score 154 is the same, it exceeds the threshold value; that is, it is possible to increase the cases determined as abnormality or on the alarm side. On the contrary, even if the score is the same, it does not exceed the threshold value; that is, it is possible to decrease the cases determined as abnormality or on the alarm side.

Therefore, for example, by performing the above (g2: Change of Algorithm according to Determination Result) in combination with the change of the threshold value of the determination condition 156 of FIG. 16, it is possible to increase the frequency at which the variable Warninglevel0 or Warninglevel1 exceeds the threshold value "1"; that is, it is possible to increase the frequency of switching to the algorithm LOF so that stricter abnormality detection may be performed.

I. Flowchart

Figure 17:
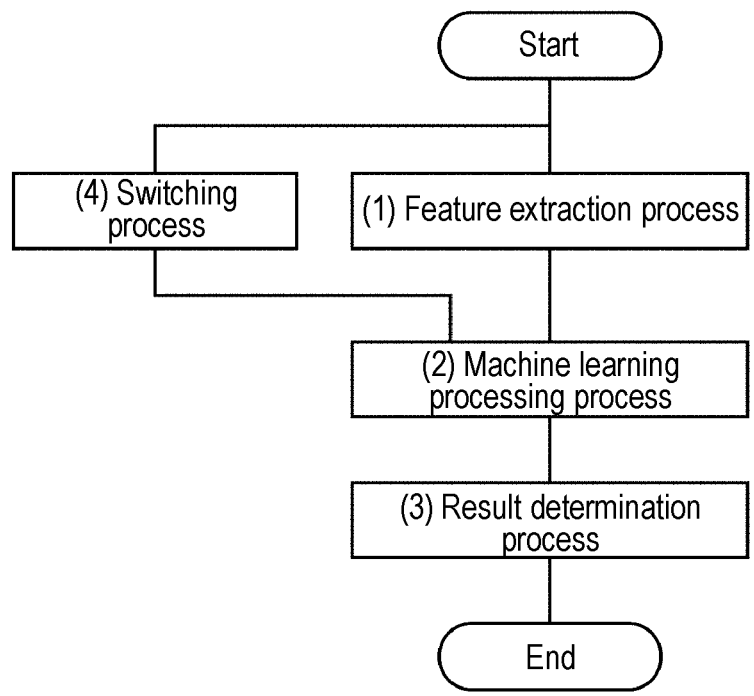
FIG. 17 is a flowchart showing an example of a process of the abnormality detection according to the embodiment.

FIG. 17 is a flowchart showing an example of a process of the abnormality detection according to the embodiment. In the embodiment, the process shown in FIG. 17 may be performed by using the devices shown in FIGS. 1 to 3 and 5.

The process shown in the flowchart may be performed by software (for example, code, instructions, programs) executed by one or more processing units (for example, the processor 102), hardware, or a combination thereof. The software may be stored in a memory (for example, on various storage devices such as the secondary storage device 108 or on the non-transitory computer readable storage medium 116 and the like). Further, the series of processing steps of the flowchart is not limited, and may be executed in combination with other series of steps. For example, in the embodiment, each step shown in FIG. 17 includes a plurality of sub steps, and the sub steps may be executed in various orders according to each step.

The processor 102 executes the process of FIG. 17. When the process is executed, the feature extraction process (1), the machine learning processing process (2), the result determination process (3), and the switching process (4) are executed.

In the feature extraction process (1), the processor 102 calculates one or a plurality of feature quantities from one or a plurality of state values acquired from a monitored object included in the controlled object of the field device group 10. In the machine learning processing process (2), the processor 102 refers to the learning model 152 and executes one of a plurality types of algorithms for calculating the score 154, which is a value indicating the probability whether any abnormality is occurring in the monitored object based on the one or plurality of feature quantities calculated in the feature extraction process (1). In the result determination process (3), the processor 102 generates the determination result 170 indicating whether any abnormality is occurring in the monitored object based on the score 154 calculated in the machine learning processing process (2). Further, in the switching process (4), the processor 102 switches the one algorithm executed in the machine learning processing process (2) according to a predetermined condition.

Further, the order of the series of processing steps in the flowchart of FIG. 17 is not limited. For example, in FIG. 17, the switching process (4) is executed in parallel with the feature extraction process (1), but the execution order is not limited to parallel execution. That is, the switching process (4) may be executed in an order that precedes the switching of the algorithm executed in the machine learning processing process (2).

J. Program

Each part shown in FIGS. 2 and 5 of the embodiment may execute the abnormality detection processing including the steps shown in FIG. 17 by executing the program necessary for the processor 102. Further, the user programs shown in FIGS. 13 to 15 may also be executed by the processor 102. A central processing unit (CPU) or the like included in the processor 102 controls each component of the control device 100 by executing a program. The secondary storage device 108 stores the programs executed by the processor 102. The storage medium 116 is a medium that stores information such as a program and the like by electric, magnetic, optical, mechanical, or chemical action so that the computer, other devices and machines can read the information such as the recorded program. The processor 102 may acquire the above-mentioned program from the storage medium 116. Further, the program may also be provided to the control device 100 by downloading from the local network 6 or the support device 200.

K. Modified Example

In the embodiment, the switching condition determination part 142 determines the switching condition and outputs the switching instruction to the machine learning processing part 144, but the switching instruction may be input by a user operation. For example, the variable time or the variable Warninglevel may be displayed on the display part 218 of the support device 200, and the user may operate the input part 216 to input the switching instruction from the support device 200 to the machine learning processing part 144.

L. Addendum

The embodiments as described above include the following technical concepts.

[Configuration 1]

A control device (100) that controls a controlled object disposed in a production process, the control device including:
  a feature extraction part (141) which calculates one or a plurality of feature quantities from one or a plurality of state values acquired from a monitored object (10) included in the controlled object;
  a processing part (144) which refers to a learning model (152) and executes one of a plurality types of algorithms for calculating a score (154), which is a value indicating a probability whether any abnormality is occurring in the monitored object, based on the one or plurality of feature quantities calculated by the feature extraction part;
  a determination part (146) which generates a determination result (170) indicating whether any abnormality is occurring in the monitored object based on the score (154) calculated by the processing part; and
  a switching part (142) which switches the one algorithm executed by the processing part according to a predetermined condition.

[Configuration 2]

The control device according to Configuration 1, wherein the predetermined condition includes a condition based on a processing time of the one algorithm executed by the processing part.

[Configuration 3]

The control device according to Configuration 1 or Configuration 2, wherein the predetermined condition includes a condition based on a processing time of the one algorithm executed by the processing part and a processing time required for a processing that generates the determination result based on the score generated by the determination part.

[Configuration 4]

The control device according to any one of Configurations 1 to 3, wherein the predetermined condition includes a condition based on the determination result generated by the determination part.

[Configuration 5]

The control device according to any one of Configurations 1 to 4, wherein the predetermined condition includes a condition based on switching of a production process.

[Configuration 6]

The control device according to any one of Configurations 1 to 4, wherein the learning model is commonly applied to the plurality types of algorithms.

[Configuration 7]

The control device according to any one of Configurations 1 to 6, wherein the learning model is an aggregate (sa, sb) of feature quantities generated from data acquired from the monitored object and defined by one or more elements, and the control device further:
  inherits a parameter (second parameter) regarding a range in an aggregate of the feature quantities used for calculating the score to an algorithm after switching.

[Configuration 8]

The control device according to any one of Configurations 1 to 7, wherein the plurality types of algorithms differ in a processing time of the algorithm or an accuracy of the calculated score.

[Configuration 9]

The control device according to Configuration 2 or Configuration 3, further including:
  a multitask execution part (159) which executes a plurality of tasks including a control task for performing a real-time control of the controlled object and a related processing task for performing a related processing related to the real-time control,
  wherein the multitask execution part repeatedly executes the control task at a predetermined cycle (71),
  the multitask execution part executes a determination processing by the determination part in the control task, and executes calculation of the score by the processing part in the related processing task, and the condition based on the processing time of the algorithm includes a condition that the processing time exceeds a time based on the predetermined cycle (71).

[Configuration 10]

A non-transitory computer-readable recording medium recording a program for causing a processor (102) to execute a control method that controls a controlled object disposed in a production process, wherein the control method includes:

a step of calculating one or a plurality of feature quantities from one or a plurality of state values acquired from a monitored object included in the controlled object;

a step of referring to a learning model and executing one of a plurality types of algorithms for calculating a score, which is a value indicating a probability whether any abnormality is occurring in the monitored object, based on the calculated one or plurality of feature quantities;

a step of generating a determination result indicating whether any abnormality is occurring in the monitored object based on the calculated score; and a step of switching the one algorithm executed in the step of executing according to a predetermined condition.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

What is claimed is:

1. A control device that controls a controlled object disposed in a production process, the control device comprises a processor configured to:

calculate one or a plurality of feature quantities from one or a plurality of state values acquired from a monitored object included in the controlled object;

refer to a learning model and execute one of a plurality types of algorithms for calculating a score, which is a value indicating a probability whether any abnormality is occurring in the monitored object, based on the one or plurality of feature quantities;

generate a determination result indicating whether any abnormality is occurring in the monitored object based on the score; and switch the one algorithm according to a predetermined condition, wherein the predetermined condition comprises a condition based on a processing time required for a processing that generates the determination result based on the score.

2. The control device according to claim 1, wherein the predetermined condition comprises a condition based on a processing time of the one algorithm.

3. The control device according to claim 1, wherein the predetermined condition comprises a condition based on the determination result.

4. The control device according to claim 1, wherein the predetermined condition comprises a condition based on switching of a production process.

5. The control device according to claim 1, wherein the learning model is commonly applied to the plurality types of algorithms.

6. The control device according to claim 1, wherein the learning model is an aggregate of feature quantities generated from data acquired from the monitored object and defined by one or more elements, and the control device further:

inherits a parameter regarding a range in an aggregate of the feature quantities used for calculating the score to an algorithm after switching.

7. The control device according to claim 1, wherein the plurality types of algorithms differ in a processing time of the algorithm or an accuracy of the calculated score.

8. The control device according to claim 1, wherein the processor is further configured to:

execute a plurality of tasks comprising a control task for performing a real-time control of the controlled object and a related processing task for performing a related processing related to the real-time control, repeatedly execute the control task at a predetermined cycle, execute a determination processing in the control task, and execute calculation of the score in the related processing task, and the condition based on the processing time of the algorithm comprises a condition that the processing time exceeds a time based on the predetermined cycle.

9. A non-transitory computer-readable recording medium, recording a control program for causing a processor to execute a control method that controls a controlled object disposed in a production process, wherein the control method comprises:

a step of calculating one or a plurality of feature quantities from one or a plurality of state values acquired from a monitored object included in the controlled object;

a step of referring to a learning model and executing one of a plurality types of algorithms for calculating a score, which is a value indicating a probability whether any abnormality is occurring in the monitored object, based on the calculated one or plurality of feature quantities;

a step of generating a determination result indicating whether any abnormality is occurring in the monitored object based on the calculated score; and a step of switching the one algorithm executed in the step of executing according to a predetermined condition wherein the predetermined condition comprises a condition based on a processing time required for a processing that generates the determination result based on the score.

* * * * *